(12) United States Patent
Sasa et al.

(10) Patent No.: US 10,855,866 B2
(45) Date of Patent: Dec. 1, 2020

(54) DOCUMENT SIZE DETECTION DEVICE, IMAGE READING DEVICE, IMAGE FORMING APPARATUS, AND DOCUMENT SIZE DETECTING METHOD

(71) Applicants: Tomohiro Sasa, Tokyo (JP); Hiroki Shirado, Kanagawa (JP); Tadaaki Oyama, Kanagawa (JP); Tatsuya Ozaki, Kanagawa (JP); Kohsuke Nambara, Kanagawa (JP)

(72) Inventors: Tomohiro Sasa, Tokyo (JP); Hiroki Shirado, Kanagawa (JP); Tadaaki Oyama, Kanagawa (JP); Tatsuya Ozaki, Kanagawa (JP); Kohsuke Nambara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/575,457

(22) Filed: Sep. 19, 2019

(65) Prior Publication Data

US 2020/0120224 A1    Apr. 16, 2020

(30) Foreign Application Priority Data

Oct. 15, 2018 (JP) .................... 2018-194608

(51) Int. Cl.
*H04N 1/00* (2006.01)

(52) U.S. Cl.
CPC ....... *H04N 1/00708* (2013.01); *H04N 1/0075* (2013.01); *H04N 1/00737* (2013.01); *H04N 1/00755* (2013.01)

(58) Field of Classification Search
CPC ........ B41J 29/38; B41J 19/145; B41J 29/393; B41J 2/04505; B41J 2/04586; B41J 2/125;

(Continued)

(56) References Cited

U.S. PATENT DOCUMENTS 5,050,079 A * 9/1991 Steeby ................ F16H 61/0248
                                                                701/52
5,606,658 A * 2/1997 Hirono .................... G06T 3/403
                                                                345/471

(Continued)

FOREIGN PATENT DOCUMENTS

JP        2014-135676       7/2014
JP        2014-179885       9/2014

OTHER PUBLICATIONS

U.S. Appl. No. 16/533,984, filed Aug. 7, 2019, Masamoto Nakazawa, et al.

*Primary Examiner* — Negussie Worku
(74) *Attorney, Agent, or Firm* — Oblon, McClelland, Maier & Neustadt, L.L.P.

(57) ABSTRACT

A document size detection device includes: a light source to irradiate a document with light; an imaging device to receive light reflected at the document; and circuitry to control switch on and off of the light source and movement in a sub-scanning direction of the light source, and determine a size of the document based on image data acquired by the imaging device. The circuitry is to determine a size in a main-scanning direction of the document based on: first image data acquired when the light source is switched off while the light source is at a first reading position; second image data acquired when the light source is switched on while the light source is at the first reading position; and third image data acquired when the light source is switched on while the light source is being moved from the first reading position to a second reading position.

14 Claims, 23 Drawing Sheets

(58) Field of Classification Search
CPC .... B41J 2/2135; B41J 11/0095; B41J 15/042;
B41J 2/16579; G01B 11/14; G01J 3/524;
G01J 3/0205; G01J 3/0262; G01J 3/027;
G01J 3/0289; G01J 3/0291; G01J 3/462;
G01J 3/50; G06K 15/102; H04N 1/04;
H04N 1/00018; H04N 1/00023; H04N
1/00031; H04N 1/00034; H04N 1/00087;
H04N 1/00249; H04N 1/00689; H04N
1/00734; H04N 1/0075; H04N 1/00753;
H04N 1/00755; H04N 1/02815; H04N
1/193; H04N 1/3872; H04N 1/40056;
H04N 1/4076; H04N 1/409; H04N 1/603;
H04N 1/6033; H04N 2201/0094; G01N
21/251

See application file for complete search history.

(56) References Cited

U.S. PATENT DOCUMENTS

| | | | | |
|---|---|---|---|---|
| 5,868,504 A * | 2/1999 | Nunokawa | ............. | B41J 3/4075 400/61 |
| 6,226,094 B1 * | 5/2001 | Watanabe | ............. | G06F 40/109 358/1.11 |
| 2002/0047994 A1 * | 4/2002 | Uchida | ................. | A61B 3/165 351/221 |
| 2002/0168116 A1 * | 11/2002 | Takayama | .......... | H04N 1/40056 382/275 |
| 2006/0001923 A1 * | 1/2006 | Kakutani | ............. | H04N 1/0071 358/509 |
| 2006/0109529 A1 * | 5/2006 | Shimazawa | ........ | H04N 1/00846 358/540 |
| 2008/0123163 A1 * | 5/2008 | Nakano | ............. | H04N 1/00681 358/498 |
| 2009/0073463 A1 * | 3/2009 | Yamada | ............... | H04N 1/3935 358/1.2 |
| 2010/0149489 A1 * | 6/2010 | Kikawa | ................ | A61B 5/0059 351/206 |
| 2011/0249069 A1 | 10/2011 | Oyama | | |
| 2012/0057211 A1 | 3/2012 | Shirado | | |
| 2012/0236373 A1 | 9/2012 | Oyama | | |
| 2014/0043629 A1 | 2/2014 | Shirado | | |
| 2014/0376063 A1 | 12/2014 | Sasa | | |
| 2015/0158309 A1 | 6/2015 | Fujii et al. | | |
| 2015/0249762 A1 | 9/2015 | Ishida et al. | | |
| 2016/0119495 A1 | 4/2016 | Konno et al. | | |
| 2016/0219163 A1 | 7/2016 | Shirado et al. | | |
| 2016/0347052 A1 | 12/2016 | Kawarada et al. | | |
| 2016/0366288 A1 | 12/2016 | Sasa et al. | | |
| 2017/0019547 A1 * | 1/2017 | Ozaki | ................ | H04N 1/00708 |
| 2017/0019567 A1 | 1/2017 | Konno et al. | | |
| 2017/0295298 A1 | 10/2017 | Ozaki et al. | | |
| 2017/0302821 A1 | 10/2017 | Sasa et al. | | |
| 2018/0139345 A1 | 5/2018 | Goh et al. | | |
| 2018/0146150 A1 | 5/2018 | Shirado et al. | | |
| 2018/0175096 A1 | 6/2018 | Inoue et al. | | |
| 2018/0213124 A1 | 7/2018 | Yokohama et al. | | |
| 2019/0230246 A1 * | 7/2019 | Abaquita | ........... | H04N 1/00411 |

* cited by examiner

FIG. 22

| STATE | DOCUMENT DETECTION POSITION: 72A<br>DOCUMENT ABSENT (FOREIGN MATTER PRESENT) | DOCUMENT DETECTION POSITION: 72B<br>DOCUMENT ABSENT | DOCUMENT DETECTION POSITION: 72C<br>DOCUMENT ABSENT | DETERMINATION |
|---|---|---|---|---|
| RELATED ART | PRESENT | — | — | PRESENT (ERROR) |
| PRESENT EMBODIMENT | PRESENT | ABSENT | ABSENT | ABSENT (CORRECT) |

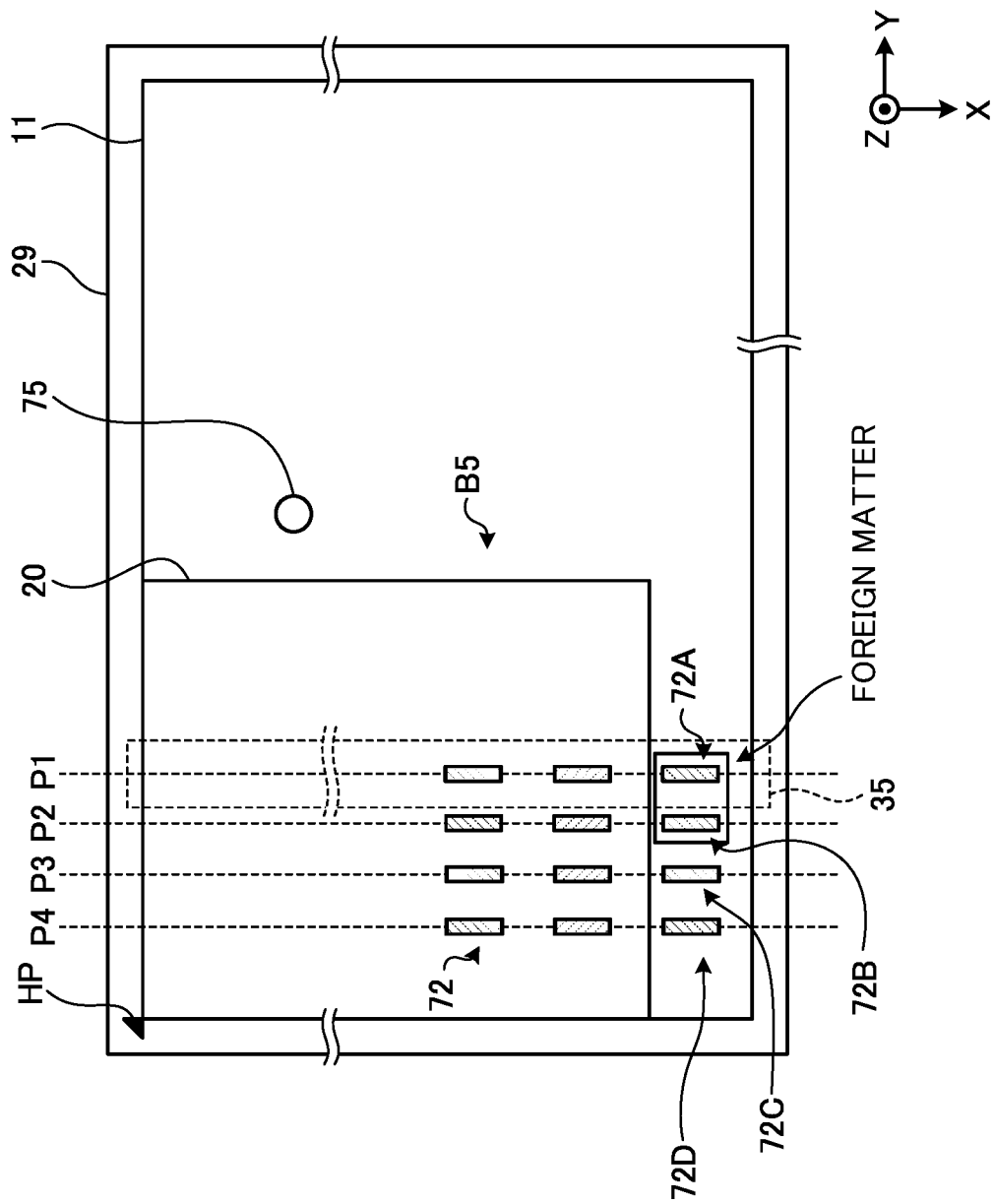

FIG. 24

| STATE | DOCUMENT DETECTION POSITION: 72A | DOCUMENT DETECTION POSITION: 72B | DOCUMENT DETECTION POSITION: 72C | DOCUMENT DETECTION POSITION: 72D | DETERMINATION |
|---|---|---|---|---|---|
| | DOCUMENT ABSENT (FOREIGN MATTER PRESENT) | DOCUMENT ABSENT (FOREIGN MATTER PRESENT) | DOCUMENT ABSENT | DOCUMENT ABSENT | |
| RELATED ART | PRESENT | — | — | — | PRESENT (ERROR) |
| PRESENT EMBODIMENT | PRESENT (EXCLUDED FROM RESULT) | PRESENT | ABSENT | ABSENT | ABSENT (CORRECT) |

DOCUMENT SIZE DETECTION DEVICE, IMAGE READING DEVICE, IMAGE FORMING APPARATUS, AND DOCUMENT SIZE DETECTING METHOD

CROSS-REFERENCE TO RELATED APPLICATIONS

This patent application is based on and claims priority pursuant to 35 U.S.C. § 119(a) to Japanese Patent Application No. 2018-194608, filed on Oct. 15, 2018 in the Japan Patent Office, the entire disclosure of which is hereby incorporated by reference herein.

BACKGROUND

Technical Field

The present invention relates to a document size detection device, an image reading device, an image forming apparatus, and a document size detecting method.

Discussion of the Background Art

In an image reading device that reads an image of a document, a document size is detected by performing pre-scanning to simply read a part of the document before performing a main scanning to read an entire image.

For example, there is a technique in which a document size is determined based on data acquired when cover is opened or a light source is switched off, data acquired when cover is opened or a light source is switched on, and data acquired when the cover is closed or the light source is switched on in order to detect a document size with high accuracy while removing influence of disturbance light even in a case where an edge portion of the document has a dark color.

In the above-described technique, a document size is determined by using data acquired in a state that movement of a light source is stopped, in other words, at a fixed reading position. Therefore, in a case where a foreign matter such as a scrap of paper, paper dust, or a fingerprint is present at the reading position, there is a high possibility that a document is erroneously determined to be present although there is no document.

SUMMARY

Example embodiments of the present invention include a document size detection device including: a light source to irradiate a document with light; an imaging device to receive light reflected at the document; and circuitry to control switch on and off of the light source and movement in a sub-scanning direction of the light source, and determine a size of the document based on image data acquired by the imaging device. The circuitry is to determine a size in a main-scanning direction of the document based on: first image data acquired when the light source is switched off while the light source is at a first reading position; second image data acquired when the light source is switched on while the light source is at the first reading position; and third image data acquired when the light source is switched on while the light source is being moved from the first reading position to a second reading position.

Example embodiments of the present invention include an image reading device including the document size detection device, and an image forming apparatus including the image reading device.

Example embodiments of the present invention include a document size detecting method, and a non-transitory recording medium storing a control program for document size detection.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 22 is a table illustrating exemplary determination processing for an edge of a document according to the seventh embodiment;

FIG. 23 is a diagram illustrating exemplary sampling of image data at the time of executing size detection processing according to an eighth embodiment;

FIG. 24 is a table illustrating exemplary determination processing for an edge of a document according to the eighth embodiment.

Figure 1:
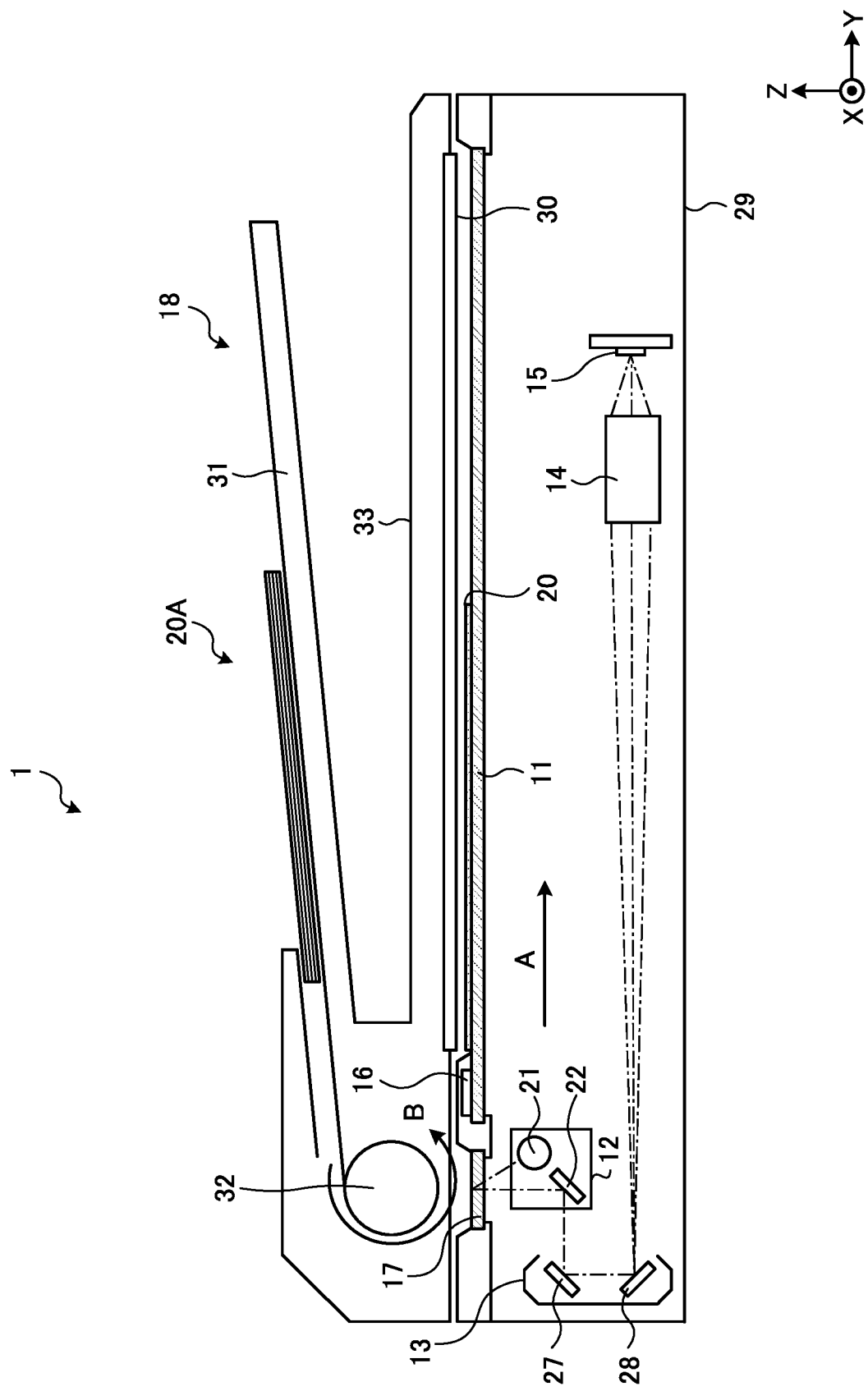
FIG. 1 is a diagram illustrating an exemplary hardware configuration of an image reading device according to a first embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Embodiments of a document size detection device, an image reading device, an image forming apparatus, and a document size detecting method will be described below in detail with reference to the attached drawings. The present invention is not limited by the following embodiments, and constituent elements in the following embodiments include those easily conceivable by a man skilled in the art, substantially the same, and included in a so-called equivalent scope. Various omissions, substitutions, changes, and combinations of the constituent elements can be made without departing from the gist of the following embodiments.

Hardware Configuration of Image Reading Device

FIG. 1 is a diagram illustrating an exemplary hardware configuration of an image reading device 1 according to a first embodiment. The image reading device 1 according to the present embodiment is a scanner device mounted on an image forming apparatus such as a digital copy machine, a digital multifunction peripheral, or a facsimile machine. The image reading device 1 may be a single scanner device. The image reading device 1 includes a document size detection device that detects a size of a document 20 to be a target of image reading. In the drawing, an X-axis corresponds to a main-scanning direction, a Y-axis corresponds to a sub-scanning direction, and a Z-axis corresponds to a height direction.

As illustrated in FIG. 1, the image reading device 1 according to the present embodiment includes a contact glass 11, a first carriage 12, a second carriage 13, a lens unit 14, an imaging device 15, a reference white board 16, a slit 17, and an auto document feeder (ADF) 18.

The contact glass 11 is a transparent plate-shaped member on which a document 20 to be a target of image reading is placed.

The first carriage 12 is a unit including a light source 21 and a first mirror 22 and movable in the sub-scanning direction (Y-axis direction) by an appropriate drive mechanism such as a stepping motor. The light source 21 is a unit that emits scanning light toward the contact glass 11 (document 20) and can include a light-emitting diode (LED), a light guide, and the like. The light source 21 emits the scanning light in order to perform: size detection processing to detect a size of each document 20; and image reading processing to read an image of the document 20. The scanning light according to the present embodiment is linear light along the main-scanning direction, and can irradiate an entire area in the main-scanning direction at one-time irradiation. The first mirror 22 reflects, to the second carriage 13 side, reflection light of the scanning light emitted from the light source 21.

The second carriage 13 is a unit including a second mirror 27 and a third mirror 28 and being movable in the sub-scanning direction by an appropriate drive mechanism such as a stepping motor. The second mirror 27 reflects the reflection light from the first carriage 12 (first mirror 22) to the third mirror 28. The third mirror 28 reflects the reflection light from the second mirror 27 to the lens unit 14.

The lens unit 14 condenses the reflection light from the second carriage 13 (third mirror 28).

The imaging device 15 includes an imaging element such as a charge coupled device (CCD) or a complementary metal oxide semiconductor (CMOS), and an analog to digital (AD) conversion circuit, and acquires image data obtained by photoelectrically converting the reflection light collected by the lens unit 14. The imaging element generates, per pixel, an analog electric signal obtained by photoelectrically converting an amount of the reflection light of the linear scanning light along the main-scanning direction for each line. The AD conversion circuit converts an analog signal to a digital signal, adjusts gain of the digital signal, and outputs image data.

The reference white board 16 is a white plate-shaped member to reflect light to be a reference in a case where the scanning light is emitted from the light source 21. The image data obtained by photoelectrically converting the reflection light from the reference white board 16 is used in shading correction and the like.

The slit 17 is a portion including a transparent plate-shaped member, similarly to the contact glass 11. During the reading processing using the ADF 18, each document 20 is irradiated with the scanning light via the slit 17 and the reflection light from the document 20 is received.

The ADF 18 is a device used at the time of reading documents 20 one by one from a document bundle 20A including a plurality of documents 20. A pressure plate 30 that presses each document 20 against the contact glass 11 is provided on a lower surface of the ADF 18. The ADF 18 is connected to a housing 29 of the image reading device 1 via an appropriate connecting member such as a hinge. The ADF 18 includes a sheet feeding tray 31, a sheet feeding roller 32, and a sheet ejection tray 33. With rotation of the sheet feeding roller 32, the documents 20 are separated one by one from the document bundle 20A placed on the sheet feeding tray 31 and fed to the slit 17. The documents 20 having passed through the slit 17 are sequentially ejected to the sheet ejection tray 33.

The first carriage 12 and the second carriage 13 are respectively moved by the stepping motors or the like in the sub-scanning direction illustrated by an arrow A while the light source 21 is emitting the scanning light at the time of normal image reading processing in which each document 20 is placed on the contact glass 11 and an image of the document 20 is read. At this point, the second carriage 13 is moved at half a speed of the first carriage 12 in order to keep a constant optical path length from the contact glass 11 to the imaging device 15.

When an image surface of each document 20 is irradiated with the scanning light, reflection light from an image surface passes through the first mirror 22, the second mirror 27, the third mirror 28, and the lens unit 14, and is subjected to image formation at the imaging device 15. The imaging device 15 photoelectrically converts, per pixel, the received reflection light (that has been subjected to the image formation). A signal that has been photoelectrically converted is converted into a digital signal. Thus, the image of the document 20 is read to acquire digital image data.

In a case of automatically feeding and reading the documents 20 by the ADF 18, the first carriage 12 and the second carriage 13 are moved to a lower side of the slit 17. After that, the documents 20 are automatically fed one by one in a direction indicated by an arrow B from the document bundle 20A placed on the sheet feeding tray 31, and an image surface of each document 20 is scanned at a position of the slit 17. At this point, the image surface of each document 20 automatically fed is irradiated with the scanning light emitted from the light source 21 of the first carriage 12, and the image of the document 20 is read to acquire digital image data in a manner similar to at the time of the above-described normal image reading. The document 20 for which the image reading has been completed is ejected to the sheet ejection tray 33.

Before performing the image reading processing as described above, size detection processing to detect a size of each document 20 placed on the contact glass 11 is performed by the document size detection device included in the image reading device 1.

Figure 2:
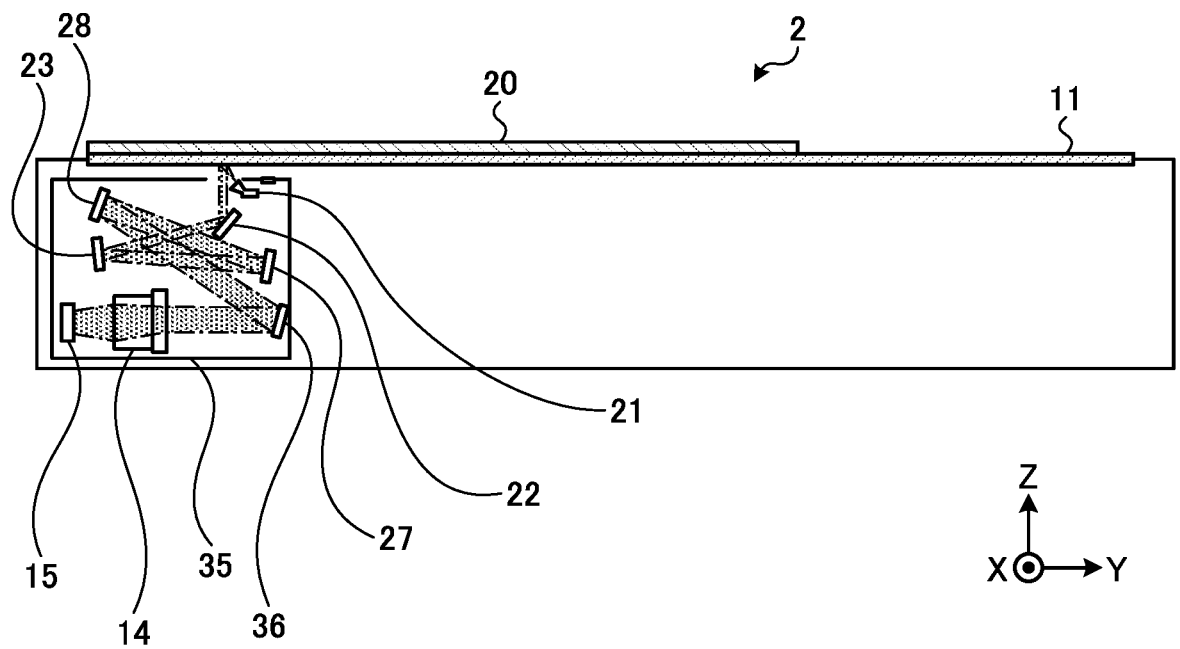
FIG. 2 is a diagram illustrating an exemplary hardware configuration of an image reading device according to a first modified example of the first embodiment.
Figure 3:
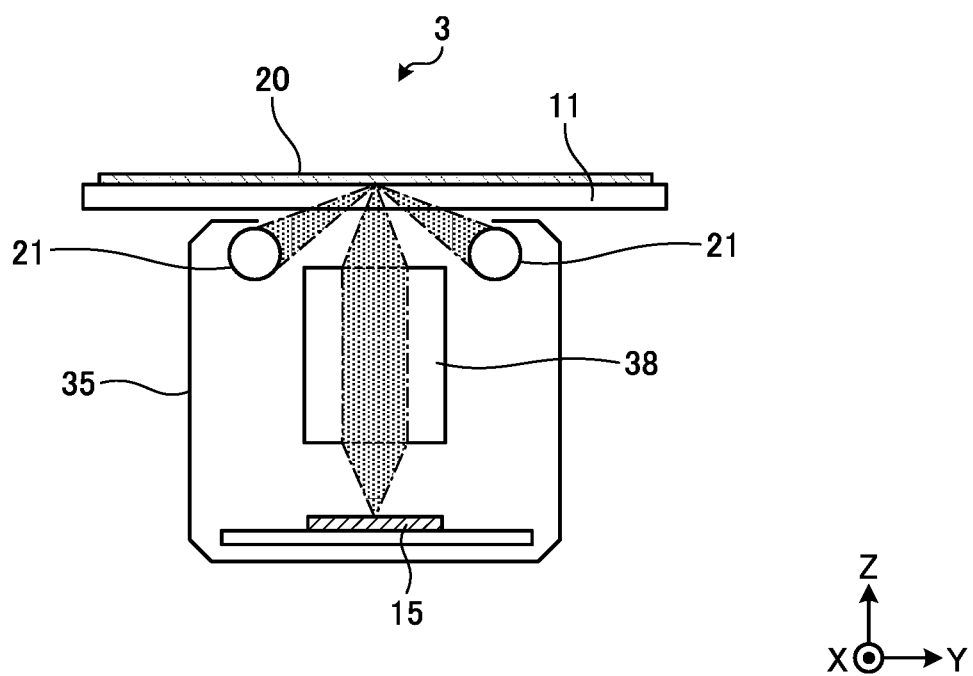
FIG. 3 is a diagram illustrating an exemplary hardware configuration of an image reading device according to a second modified example of the first embodiment.

Note that the hardware configuration of the image reading device 1 is not limited to the above. FIG. 2 is a diagram illustrating an exemplary hardware configuration of an image reading device 2 according to a first modified example of the first embodiment. FIG. 3 is a diagram illustrating an exemplary hardware configuration of an image reading device 3 according to a second modified example of the first embodiment.

In the configuration illustrated in FIG. 1, the light source 21 and the three mirrors 22, 27, and 28 are separately housed in the two carriages 12 and 13. On the other hand, in the first modified example illustrated in FIG. 2, the light source 21, the first mirror 22, the second mirror 27, the third mirror 28, a fourth mirror 36, the lens unit 14, and the imaging device 15 are housed inside one carriage 35, and the carriage 35 is displaced in the sub-scanning direction (Y-axis direction).

In the second modified example illustrated in FIG. 3, two of the light sources 21, a lens unit 38, and the imaging device 15 are housed inside the one carriage 35, and the carriage 35 is displaced in the sub-scanning direction. The lens unit 38 according to the present modified example is an equal magnification imaging forming lens.

Functional Configuration of Document Size Detection Device

Figure 4:
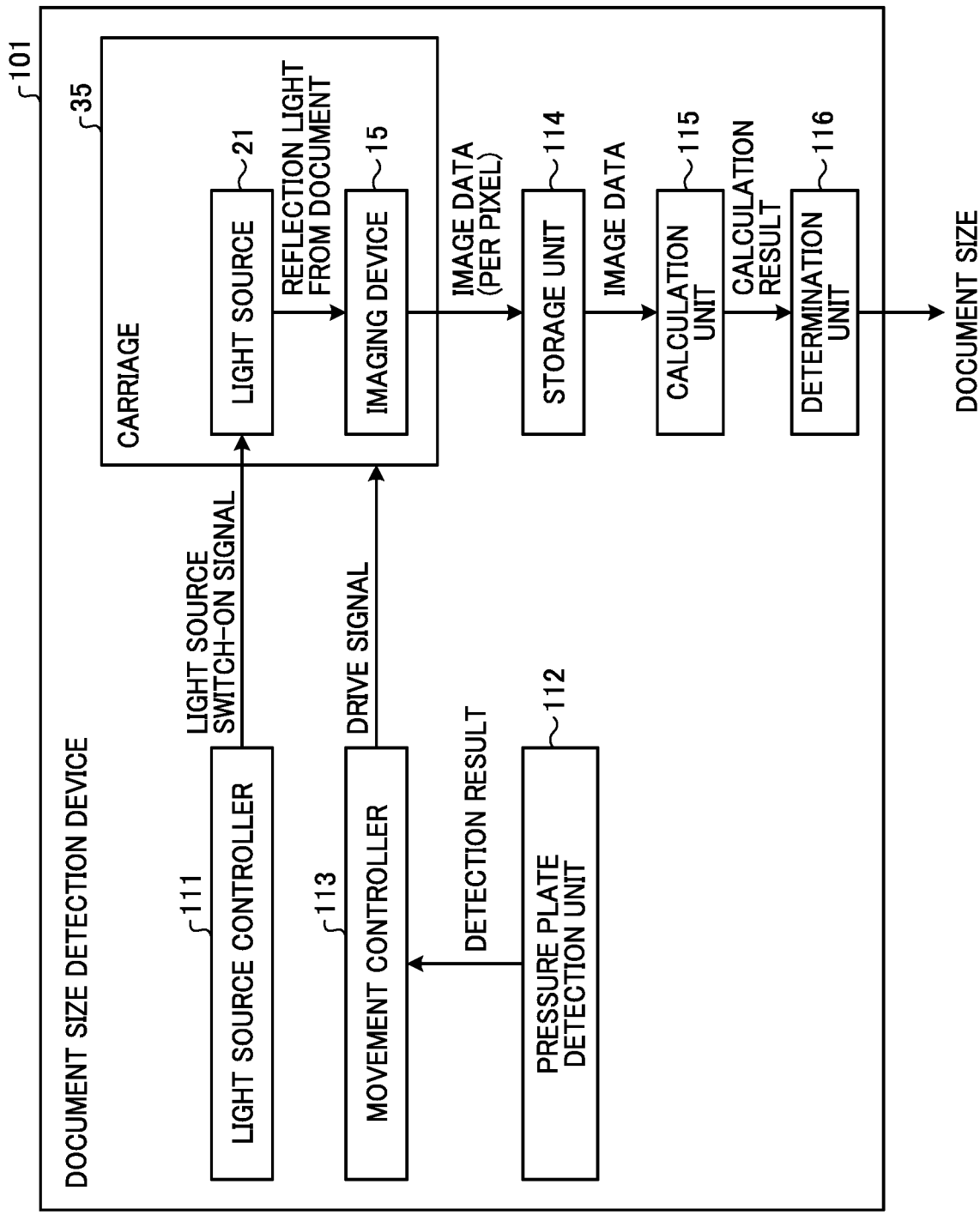
FIG. 4 is a block diagram illustrating an exemplary functional configuration of a document size detection device according to the first embodiment.

FIG. 4 is a block diagram illustrating an exemplary functional configuration of a document size detection device 101 according to the first embodiment. The document size detection device 101 according to the present embodiment is provided in, for example, each of the image reading devices 1 to 3 respectively having the above-described hardware configurations, and performs size detection processing to detect a size of each document 20 before the image reading processing is performed. Here, a description will be provided for the document size detection device 101 mounted on each of the image reading devices 2 and 3 having the configuration in which the light source 21 and the imaging device 15 are housed in the one carriage 35 as illustrated in FIG. 2 or 3.

The document size detection device 101 according to the present embodiment includes a light source controller 111, a pressure plate detection unit 112, a movement controller 113, a storage unit 114, a calculation unit 115, and a determination unit 116.

The light source controller 111 controls a drive state of the light source 21. The light source 21 switches on/off of the light source 21 in accordance with a light source switch-on signal output from the light source controller 111. The light source switch-on signal may be, for example, drive current or the like of a light emission element such as an LED included in the light source 21.

The pressure plate detection unit 112 detects an opened/closed state of a pressure plate that presses each document 20 against the contact glass 11. A specific configuration of the pressure plate should not be particularly limited and may be, for example, a pressure plate fixed to the lower surface portion of the ADF 18 as illustrated in FIG. 1 or may be a single plate-shaped member or the like connected in an openable/closable manner using a hinge or the like. A method of detecting the opened/closed state is not particularly limited, but the opened/close stated can be detected based on, for example, an angle between the pressure plate and the contact glass 11 or the like.

The movement controller 113 controls movement in the sub-scanning direction of the carriage 35. The movement controller 113 outputs a drive signal to a drive mechanism such as an electric motor that displaces the carriage 35. The movement controller 113 generates a drive signal based on a detection result, in other words, the opened/closed state of the pressure plate by the pressure plate detection unit 112.

The storage unit 114 stores image data indicating, per pixel, intensity (amount) of reflection light acquired by the imaging device 15 receiving the reflection light from each document 20. The storage unit 114 according to the present embodiment stores image data acquired when the light source 21 is in an ON state and image data acquired when the light source 21 is in an OFF state.

The calculation unit 115 performs calculation based on the image data stored in the storage unit 114. The calculation unit 115 calculates a difference between the image data acquired when the light source 21 is in the ON state and the image data acquired when the light source 21 is in the OFF state, and also performs average processing for a plurality of pieces of image data, and the like.

The determination unit 116 determines the size of document 20 based on the calculation result of the calculation unit 115. The determination result (document size) by the determination unit 116 is used at the time of executing, for example, the image reading processing and the like.

The above-described respective functional units 111 to 116 are implemented by using one or more integrated circuits. The above-described respective functional units 111 to 116 may be implemented by causing a processor such as a central processing unit (CPU) to execute a program, in other words, by software. Furthermore, the above-described respective functional units 111 to 116 may be implemented by a processor such as a dedicated integrated circuit (IC), in other words, by hardware. Moreover, the above-described respective functional units 111 to 116 may be implemented by using the software and the hardware in combination. In a case of using a plurality of processors, each of the processors may implement one of the respective functional units 111 to 116 or may implement two or more of the respective functional units 111 to 116.

A program to implement the functions of the document size detection device 101 may be provided as a file in an installable format or an executable format by being recorded in a computer-readable recording medium such as a compact disc read only memory (CD-ROM), a flexible disk (FD), a compact disc recordable (CD-R), or a digital versatile disk (DVD). Additionally, the program may be provided by downloading the program to a predetermined computer from a predetermined storage device connected to a network, or may be provided in a predetermined information processing device by being preliminarily incorporated in a ROM or the like. Furthermore, the program may include a plurality of modules that implements the functions of the above-described functional units 111 to 116.

Method of Acquiring Image Data During Size Detection

Figure 5:
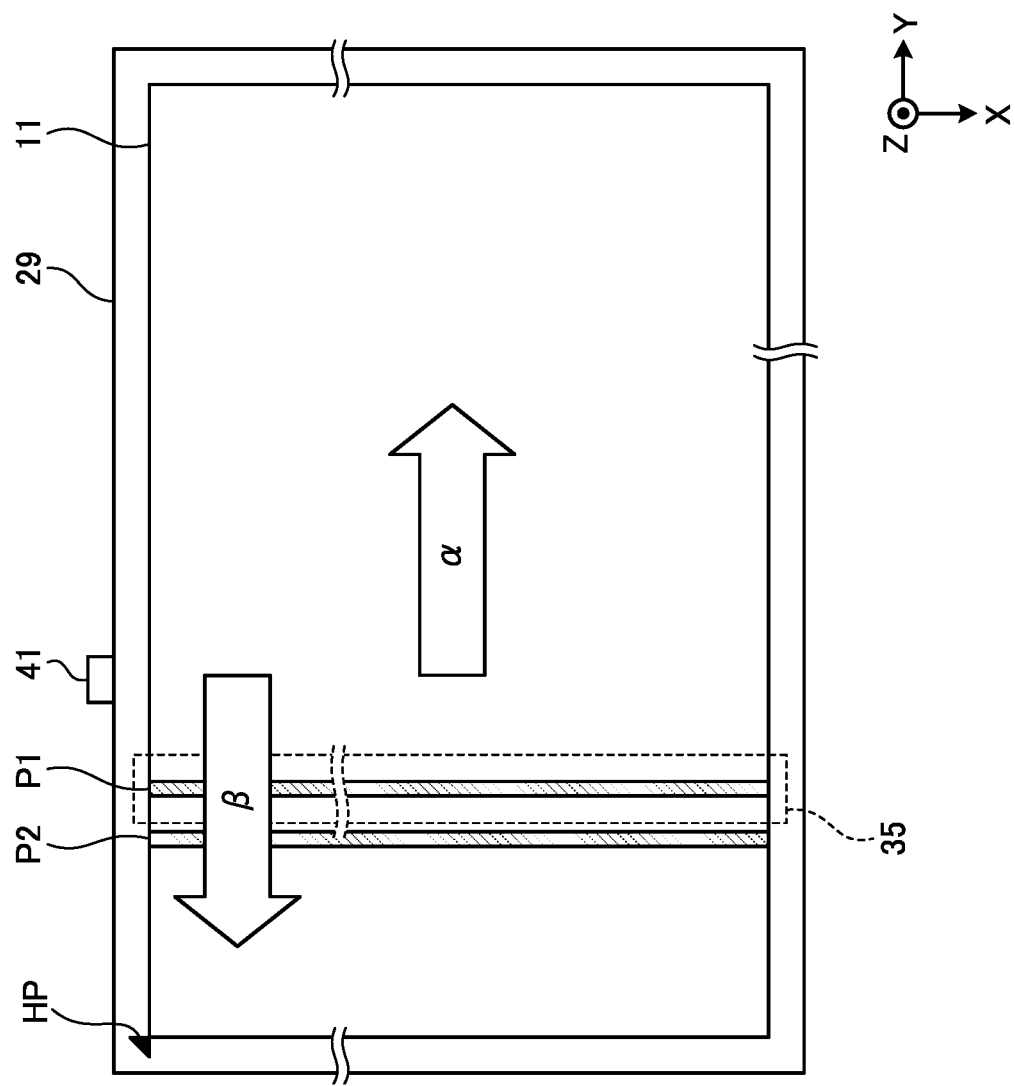
FIG. 5 is a diagram illustrating exemplary reading positions of image data at the time of executing size detection processing according to the first embodiment.

FIG. 5 is a diagram illustrating exemplary reading positions P1 and P2 of image data at the time of executing the size detection processing according to the first embodiment. In the present embodiment, when the size detection processing is executed, image data is acquired at each of the two reading positions P1 and P2.

When a pressure plate sensor 41 (pressure plate detection unit) that detects an angle (pressure plate angle) between the pressure plate and the contact glass 11 detects that the pressure plate angle has become a threshold or less, the image data when the light source is switched off (first image data) and image data when the light source is switched on (second image data) are acquired at the first reading position P1. After that, the carriage 35 is moved to the second reading position P2 to acquire image data when the light source is switched on (third image data) at the second reading position P2. The first image data and the second image data are acquired while the carriage 35 is stopped at the first reading position P1. The third image data is acquired while the carriage 35 is moved (when the carriage 35 passes through the second reading position P2). At this point, the carriage 35 is moved along a direction β opposite to a moving direction α at the time of image reading. At the time of image reading, the carriage 35 is moved along the direction α from a home position HP.

Figure 6:
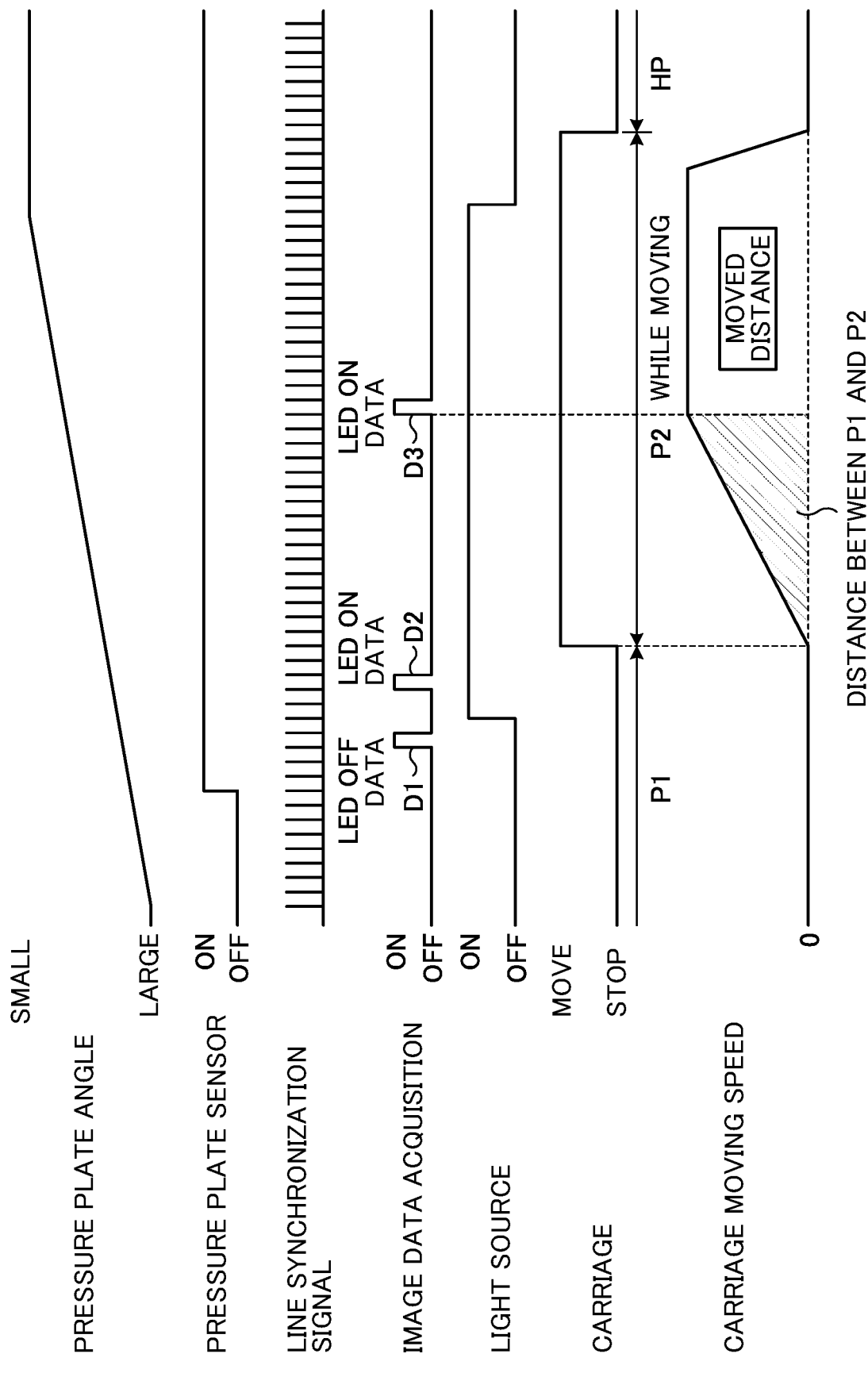
FIG. 6 is a timing chart illustrating exemplary operation of the document size detection device according to the first embodiment.

FIG. 6 is a timing chart illustrating exemplary operation of the document size detection device 101 according to the first embodiment. FIG. 6 illustrates the operation when the pressure plate shifts from the opened state to the closed state (when the pressure plate angle is gradually decreased). At this point, when the pressure plate sensor 41 detects that the pressure plate angle has become the threshold or less, first image data D1 (image data when the light source is switched off at the first reading position P1) is acquired by the imaging device 15 inside the carriage 35 located at the first reading position P1. After that, the light source 21 is switched on, and second image data D2 (image data when the light source is switched on at the first reading position P1) is acquired. Then, the carriage 35 is moved to the second reading position P2 while accelerating the carriage, and third image data D3 (image data when the light source is switched on at the second reading position P2) is acquired at the second reading position P2. After completion of the acceleration of the carriage 35, the third image data D3 is acquired while being moved at a constant speed. Then, the carriage 35 is moved to the home position HP and stopped.

The first image data D1 to the third image data D3 are each acquired in synchronization with a predetermined line synchronization signal. In the present embodiment, a data acquisition time of each of the first image data D1 to the third image data D3 corresponds to one cycle of the line synchronization signal.

As described above, in the present embodiment, the data when the light source is switched on is acquired at two points including the first reading position P1 and the second reading position P2. Then, a size (a length in the main-scanning direction) of each document 20 is detected based on: the first image data D1 acquired at the first reading position P1; the second image data D2 acquired at the first reading position P1; and the third image data D3 acquired at the second reading position P2. Consequently, even in a case where a foreign matter (such as a scrap of paper, paper dust, or a fingerprint) is present near an edge of the document 20 at the first reading position P1, the document size can be accurately detected.

Figure 7:
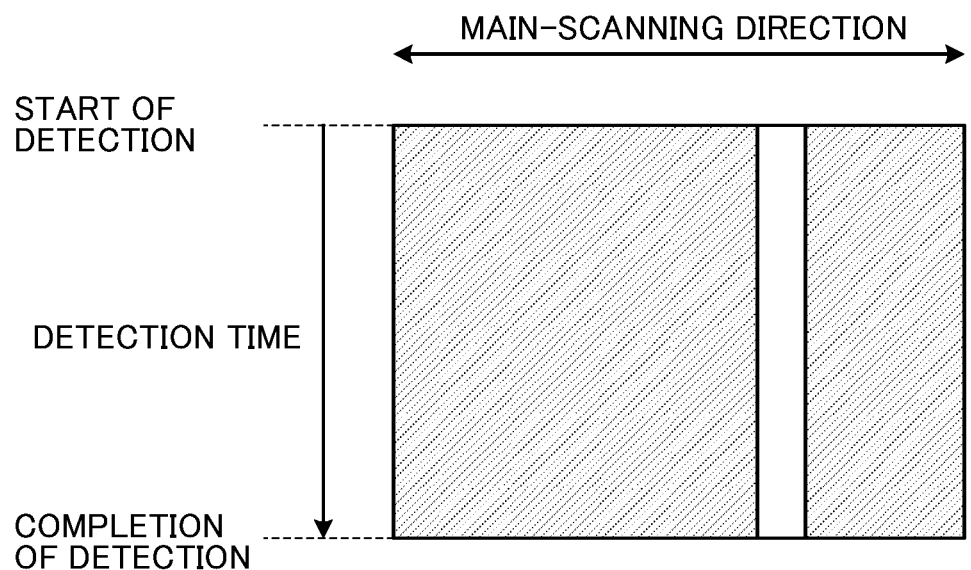
FIG. 7 is a diagram illustrating an exemplary detection result of an edge of a document in a comparative example.

FIG. 7 is a diagram illustrating an exemplary detection result of an edge of a document 20 in a comparative example. In FIG. 7, a horizontal axis represents a position in the main-scanning direction, and a vertical axis represents a detection time. Here, illustrated is an example in which a white foreign matter is mixed in an area where a black document 20 is present. In this comparative example, assume that the edge of the document 20 is detected from the first image data D1 and the second image data D2 acquired at the first reading position P1. In this case, the influence of the foreign matter in an entire portion of the acquired image data becomes large, and there is a higher possibility of erroneously determining, as the edge of the document 20, a portion where the foreign matter is present.

Figure 8:
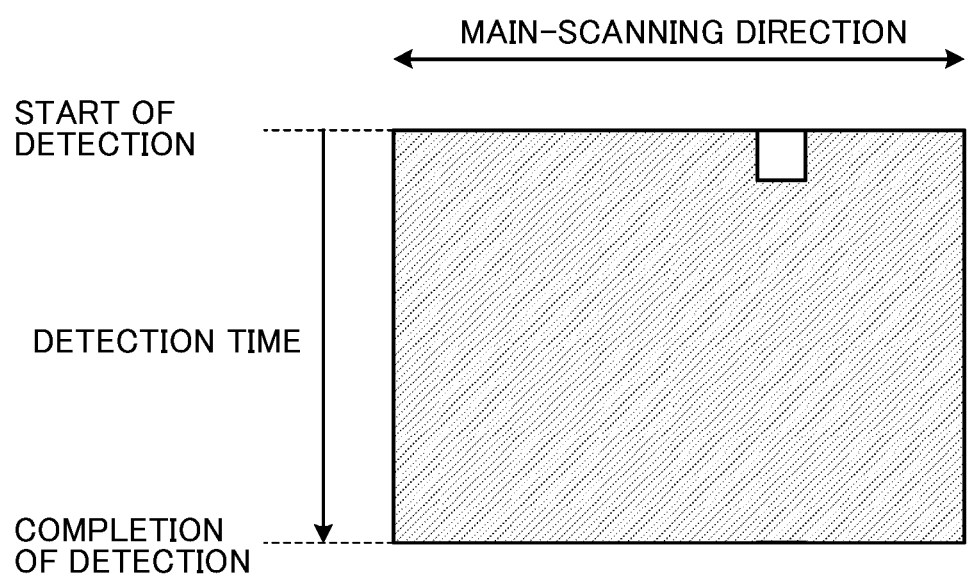
FIG. 8 is a diagram illustrating an exemplary detection result of an edge of a document in the first embodiment.

FIG. 8 is a diagram illustrating an exemplary detection result of an edge of a document 20 in the first embodiment. According to the present embodiment, reference is made to not only the first image data D1 and the second image data D2 but also the third image data D3 acquired at the second reading position P2. Therefore, when there is no foreign matter at the second reading position P2, the influence of the foreign matter on the entire portion of the acquired image data is more reduced. As a result, there is a less possibility that the edge of the document 20 is erroneously detected due to the foreign matter.

As described above, according to the present embodiment, accuracy of document size detection can be improved.

In the following, other embodiments will be described with reference to the drawings, but components/units having functions and effects same as or similar to the components/units of the first embodiment may be denoted by the same reference signs, and descriptions of the components/units may be omitted.

Second Embodiment

Figure 9:
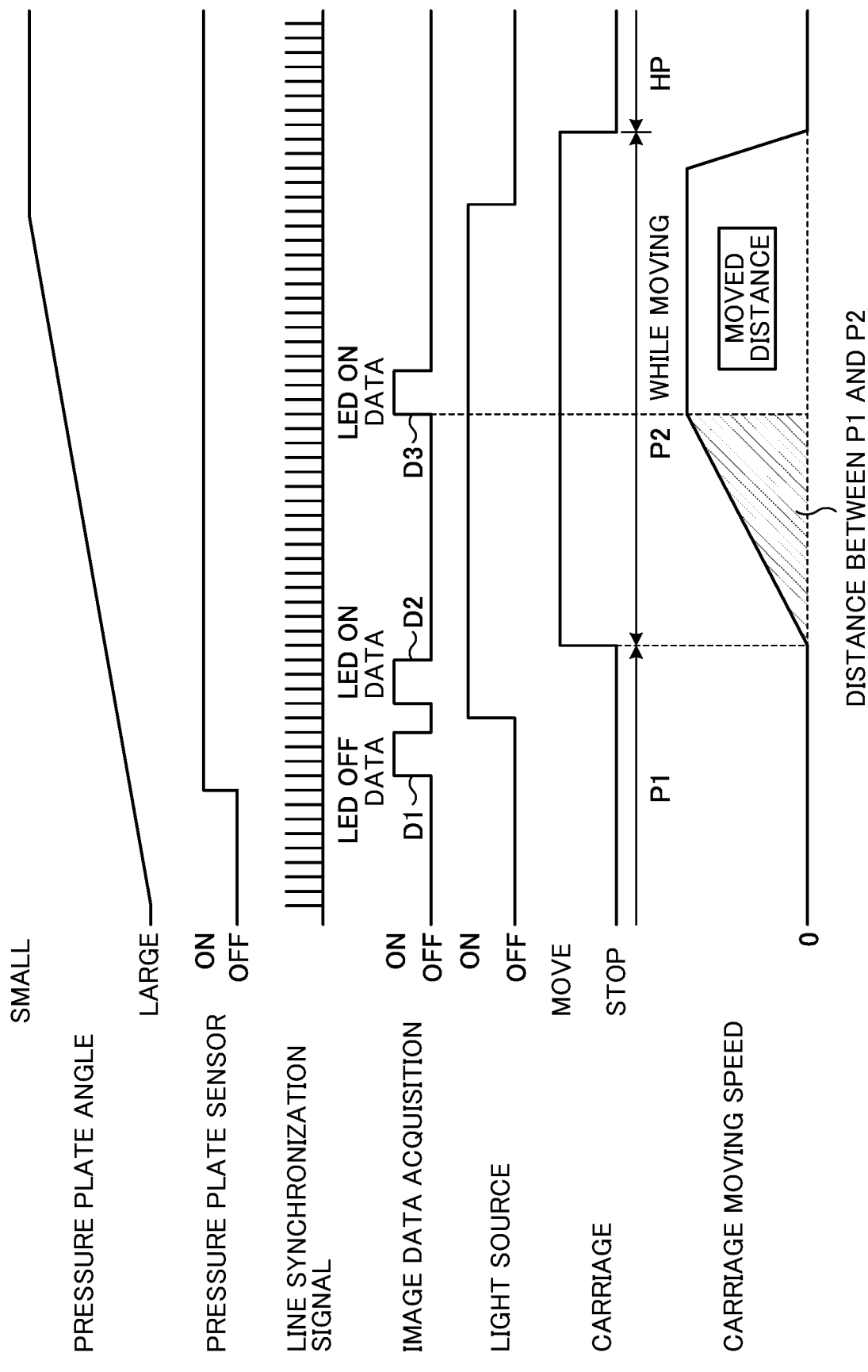
FIG. 9 is a timing chart illustrating exemplary operation of a document size detection device according to a second embodiment.

FIG. 9 is a timing chart illustrating exemplary operation of a document size detection device 101 according to a second embodiment. In the present embodiment, a data acquisition time of each of first image data D1 to third image data D3 corresponds to a plurality of cycles of a line synchronization signal. In the example illustrated in FIG. 9, the data acquisition time of each of the first image data D1 to the third image data D3 corresponds to three cycles (3 lines).

Figure 10:
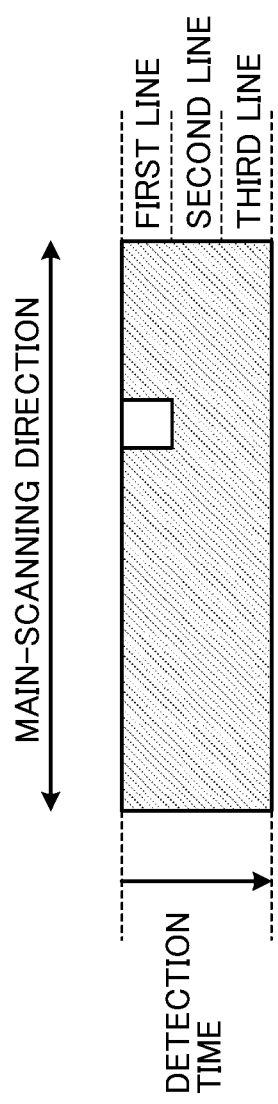
FIG. 10 is a diagram illustrating an exemplary detection result of an edge of a document in the second embodiment.

FIG. 10 is a diagram illustrating an exemplary detection result of an edge of a document 20 in the second embodiment. In the present example, a foreign matter is detected in a first line, but no foreign matter is detected in a second line and a third line. Such a phenomenon occurs in a case where, for example, a small foreign matter is present at a first reading position P1 or a second reading position P2.

Thus, the data acquisition time of each of the first image data D1 to the third image data D3 is set to correspond to the plurality of cycles, and a calculation unit 115 performs average processing for the respective pieces of the data D1 to D3, thereby reducing influence of the foreign matter.

Third Embodiment

Figure 11:
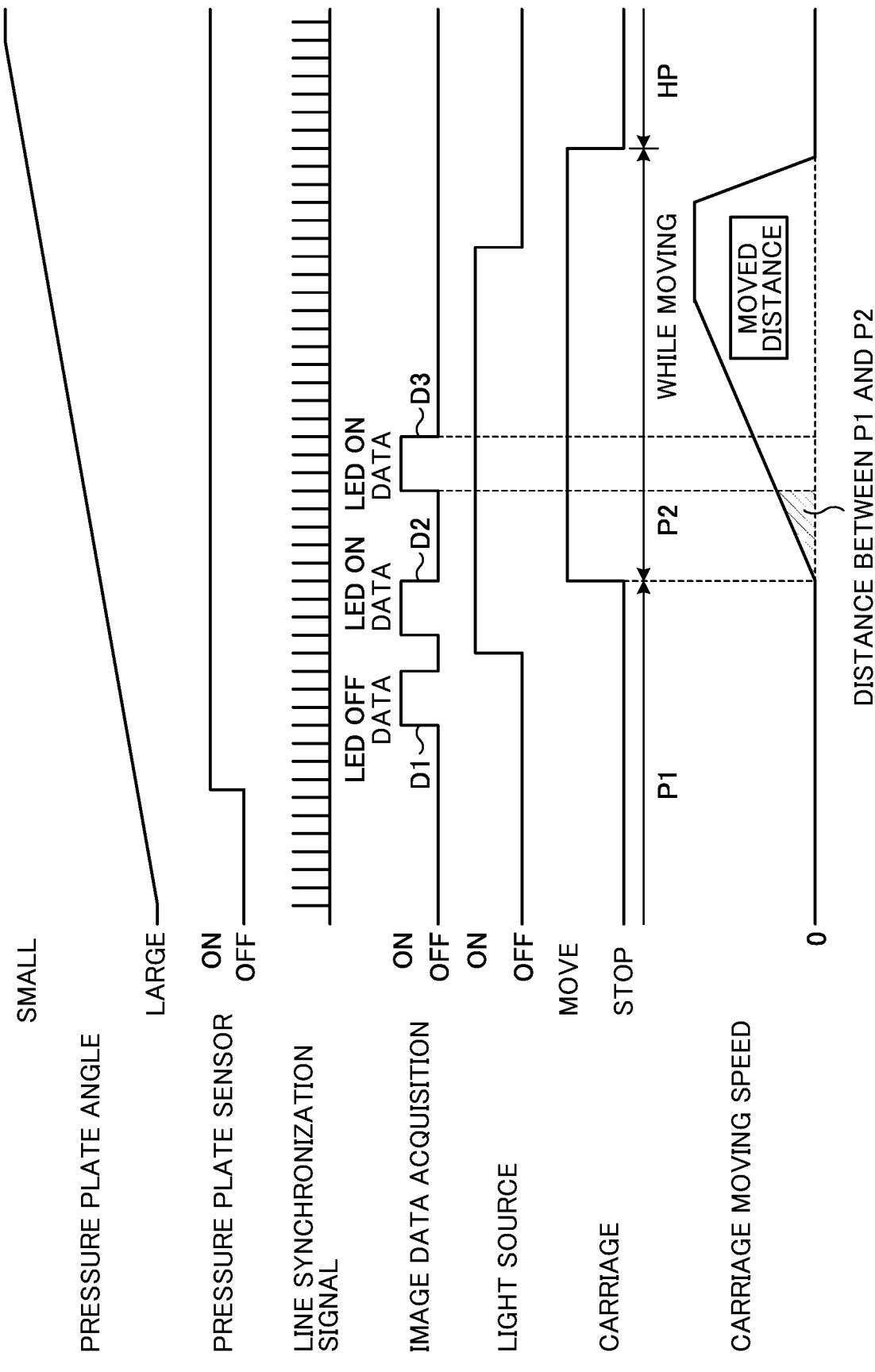
FIG. 11 is a timing chart illustrating exemplary operation of a document size detection device according to a third embodiment.

FIG. 11 is a timing chart illustrating exemplary operation of a document size detection device 101 according to a third embodiment. In the present embodiment, third image data D3 is acquired while a carriage 35 is accelerated. Consequently, a time required for size detection processing can be shortened.

Fourth Embodiment

Figure 12:
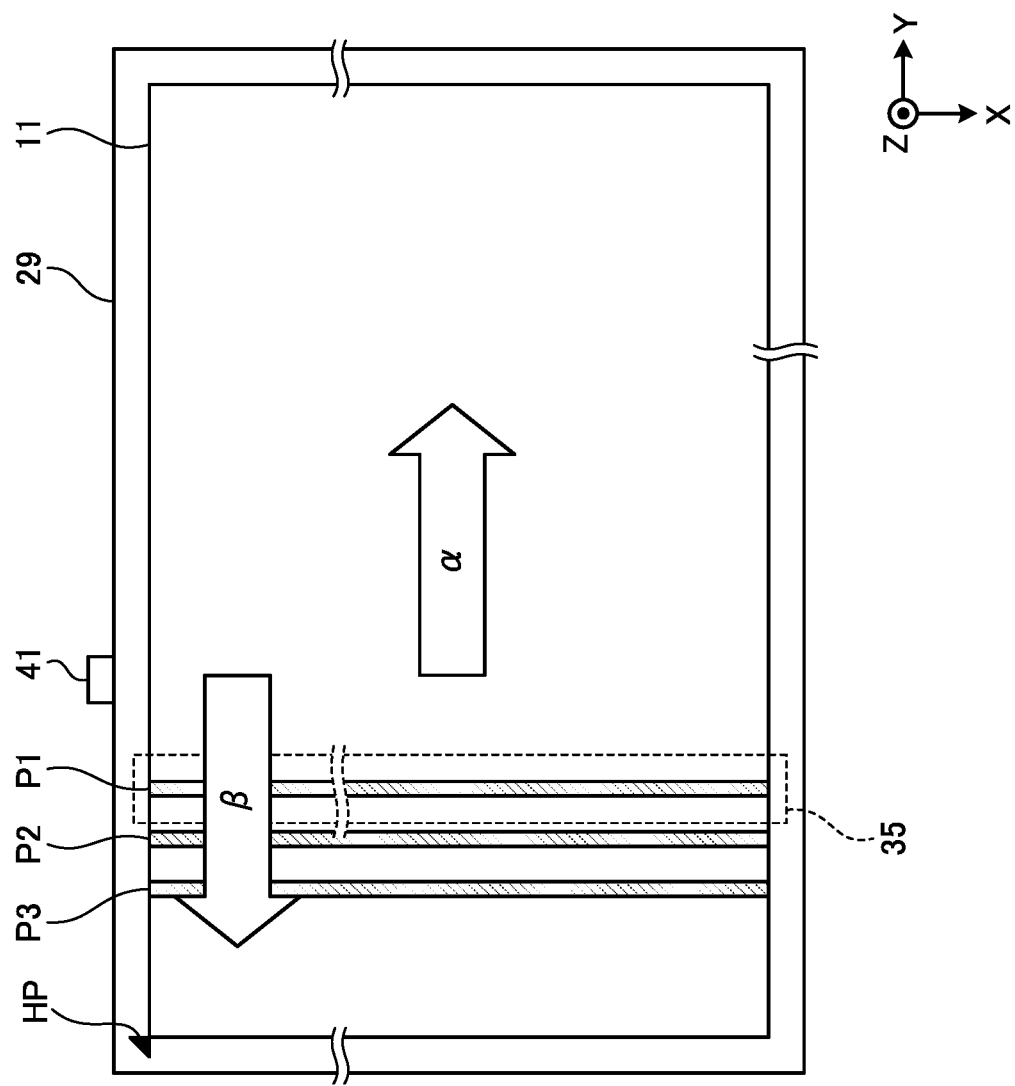
FIG. 12 is a diagram illustrating exemplary reading positions of image data at the time of executing size detection processing according to a fourth embodiment.

FIG. 12 is a diagram illustrating exemplary reading positions P1, P2, and P3 of image data at the time of executing size detection processing according to a fourth embodiment. In the present embodiment, image data when a light source is switched on (fourth image data) is acquired not only at the first and second reading positions P1 and P2 but also at a third reading position P3 closer to a home position HP than the second reading position P2 is. Then, an edge position of a document 20 in a main-scanning direction is determined by using first image data to the fourth image data.

Figure 13:
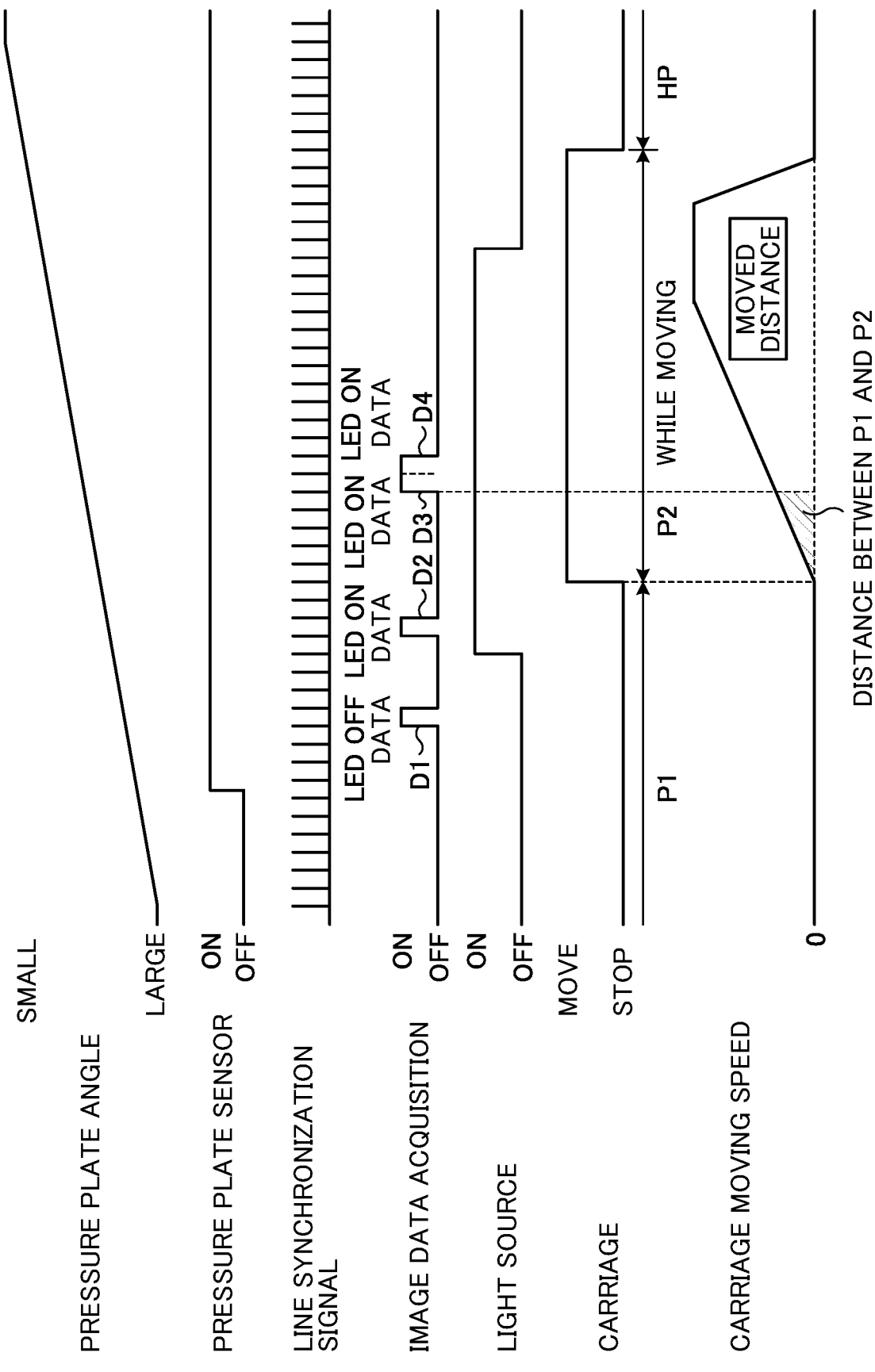
FIG. 13 is a timing chart illustrating first exemplary operation of a document size detection device according to the fourth embodiment.

FIG. 13 is a timing chart illustrating first exemplary operation of a document size detection device 101 according to the fourth embodiment. In the first exemplary operation, acquisition timing of third image data D3 and acquisition timing of fourth image data D4 are successive in cycles of line synchronization signals. With adoption of such acquisition timing, a processing speed of the size detection processing can be improved.

Figure 14:
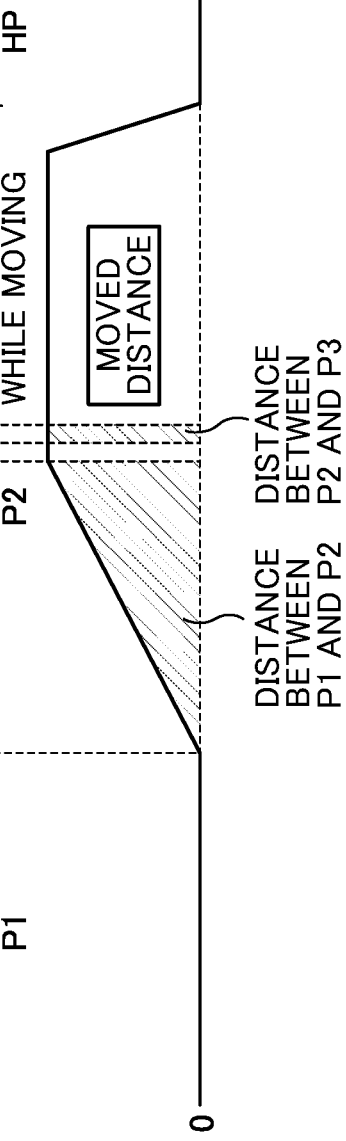
FIG. 14 is a timing chart illustrating second exemplary operation of the document size detection device according to the fourth embodiment.

FIG. 14 is a timing chart illustrating second exemplary operation of the document size detection device 101 according to the fourth embodiment. In the second exemplary operation, there is an interval (one line in this example) between the acquisition timing of the third image data D3 and the acquisition timing of the fourth image data D4. With adoption of such acquisition timing, a position distant from the second reading position P2 can be set as the third reading position P3. Therefore, influence of a foreign matter can be further reduced.

With increase in the number of reading positions as described above, accuracy of document size detection can be further improved.

Fifth Embodiment

Figure 15:
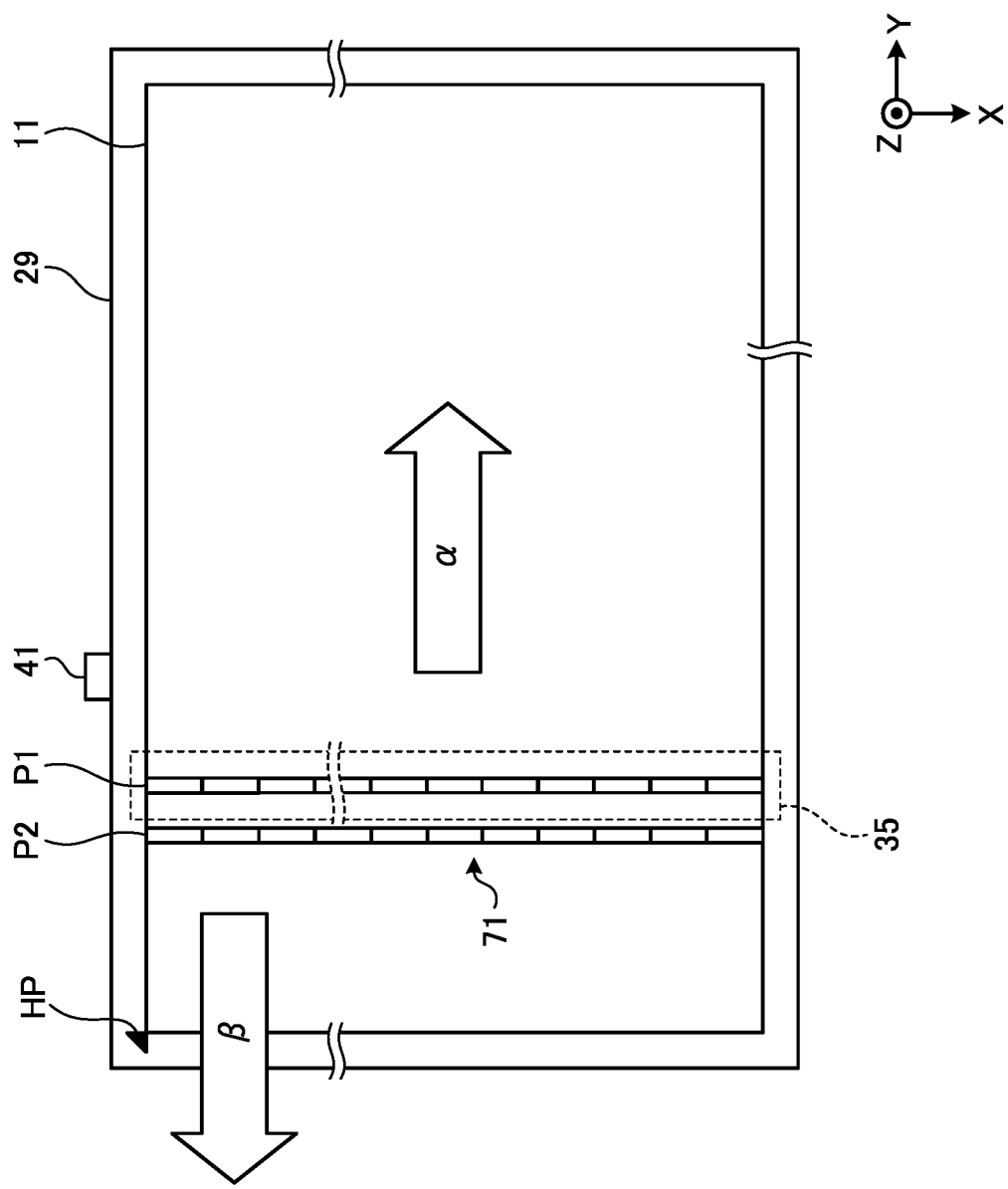
FIG. 15 is a diagram illustrating exemplary sampling of image data at the time of executing size detection processing according to a fifth embodiment.

FIG. 15 is a diagram illustrating exemplary sampling of image data at the time of executing size detection processing according to a fifth embodiment. In the present embodiment, sampling is performed per a plurality of divided areas 71 obtained by dividing, along a main-scanning direction, an acquisition area of first image data D1 and second image data D2 which are acquired at a first reading position P1 and an acquisition area of third image data D3 acquired at a second reading position P2. In the example illustrated in FIG. 15, the acquisition area where each of the image data D1 to the image data D3 is acquired is divided into eleven divided areas 71.

Consequently, a data amount can be reduced more than in a case where sampling is performed for all pixels in the main-scanning direction, memory capacity can be reduced, a processing speed can be improved, and the like.

Sixth Embodiment

Figure 16:
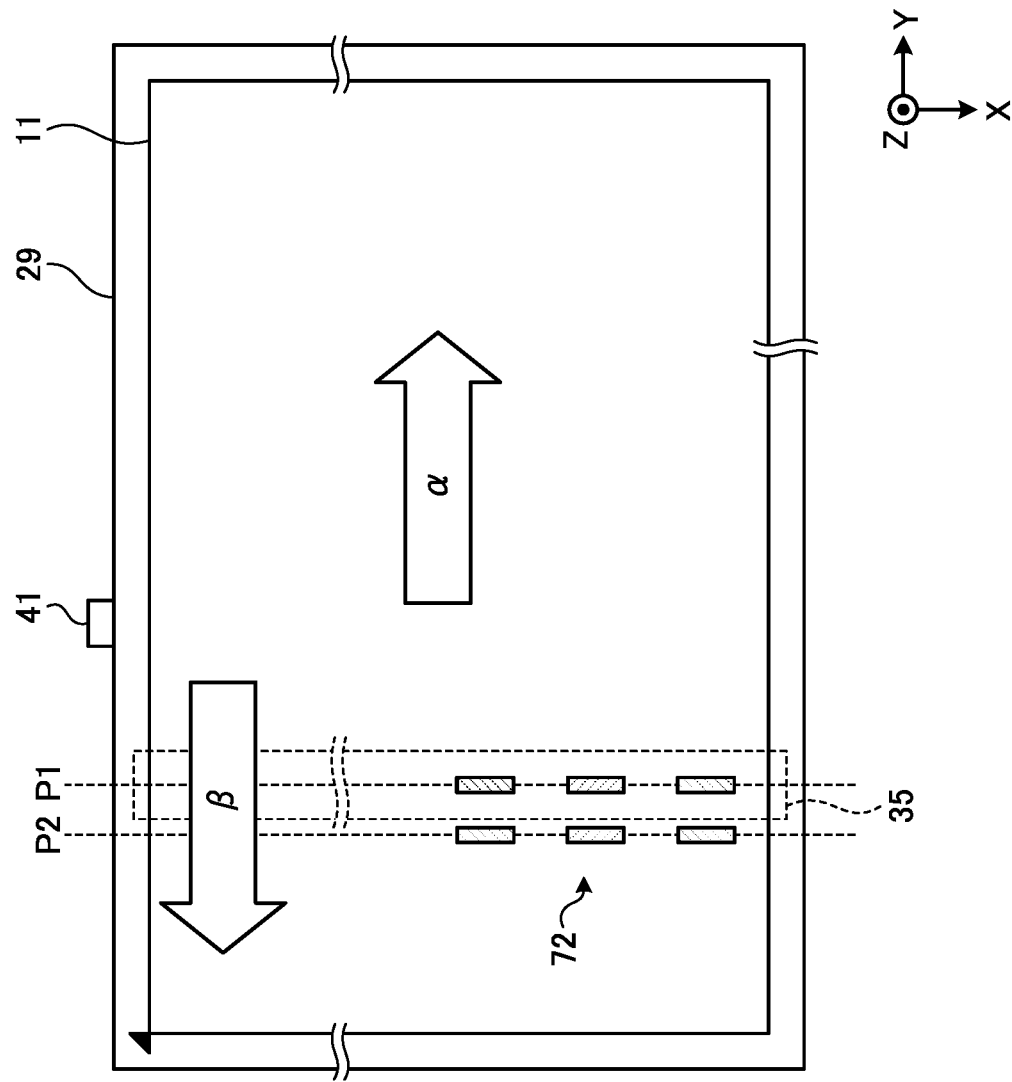
FIG. 16 is a diagram illustrating exemplary sampling of image data at the time of executing size detection processing according to a sixth embodiment.

FIG. 16 is a diagram illustrating exemplary sampling of image data at the time of executing size detection processing according to a sixth embodiment. In the present embodiment, sampling is performed per discrete area 72 obtained by discretely dividing, in a main-scanning direction, an acquisition area of first image data D1 and second image data D2 which are acquired at a first reading position P1 and an acquisition area of third image data D3 acquired at a second reading position P2. In the example illustrated in FIG. 16, three discrete areas 72 are set in each of the reading positions P1 and P2. The discrete areas 72 are set so as to be able to identify standard sizes such as A4 and B5.

Figure 17:
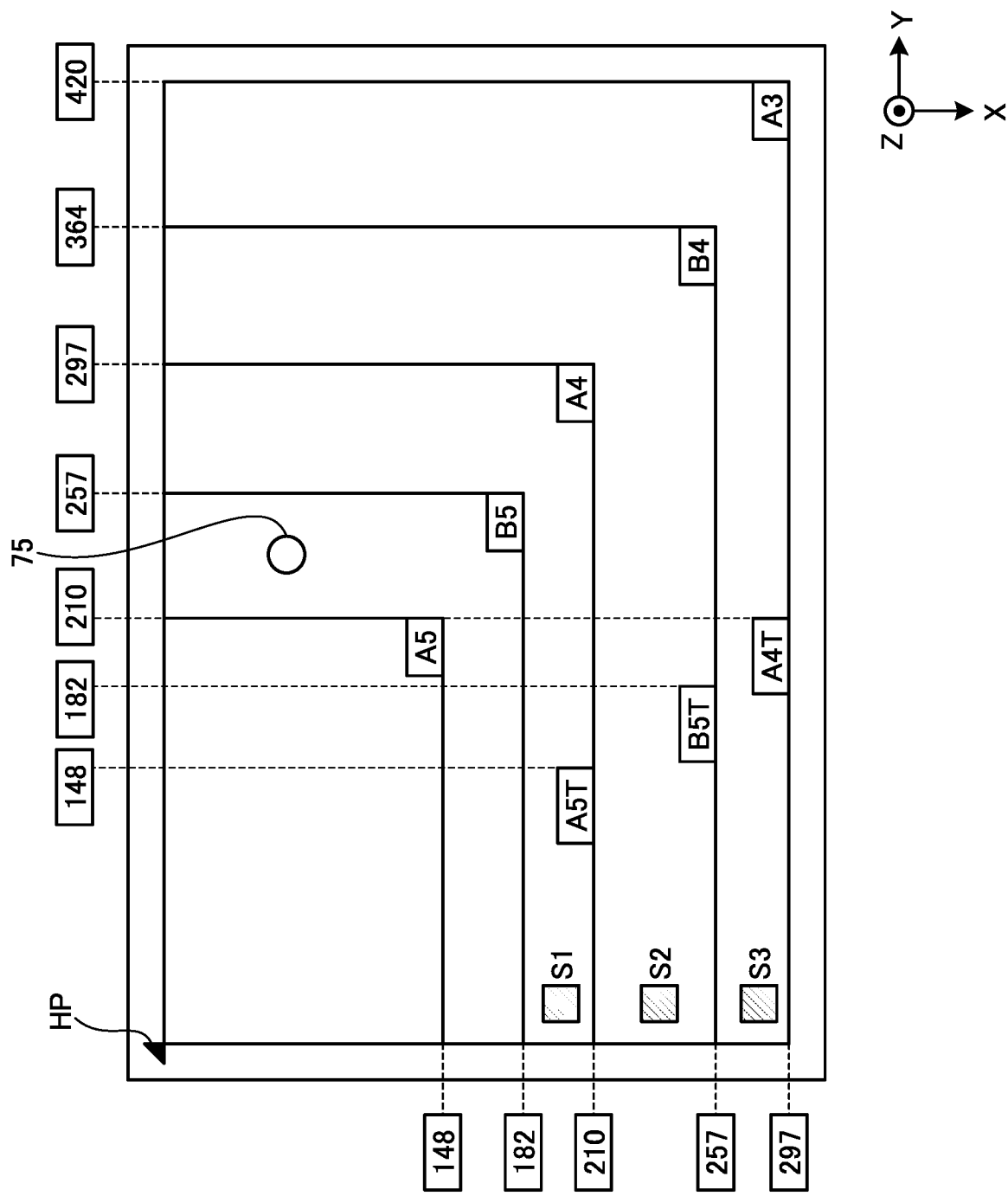
FIG. 17 is a diagram illustrating exemplary installation positions of sensors to detect standard sizes.

FIG. 17 is a diagram illustrating exemplary installation positions of sensors in order to detect the standard sizes. In the present example, three main-scanning sensors S1 to S3 to detect presence/absence of a document in the main-scanning direction and one sub-scanning sensor 75 to detect presence/absence of a document in the sub-scanning direction are arranged. The first main-scanning sensor S1 detects a document present in a range from 182 MM to 210 mm, the second main-scanning sensor S2 detects a document present in a range from 210 mm to 257 mm, and the third main-scanning sensor S3 detects a document present in a range from 257 mm and 297 mm. The sub-scanning sensor 75 detects a document present in a range from 210 mm to 257 mm. With such an arrangement of the respective sensors, a size of a document having one of the standard sizes can be detected. For example, in a case where a detection result of the third main-scanning sensor S3 is "present" and a detection result of the sub-scanning sensor 75 is "present", it can be determined that the size of the document is A3. Additionally, in a case where a detection result of the third main-scanning sensor S3 is "absent", a detection result of the second main-scanning sensor S2 is "present", and a detection result of the sub-scanning sensor 75 is "present", it can be determined that the size of the document is B4. The discrete areas 72 according to the present embodiment are set so as to correspond to the installation positions of the first to third main-scanning sensors S1 to S3.

Figure 18:
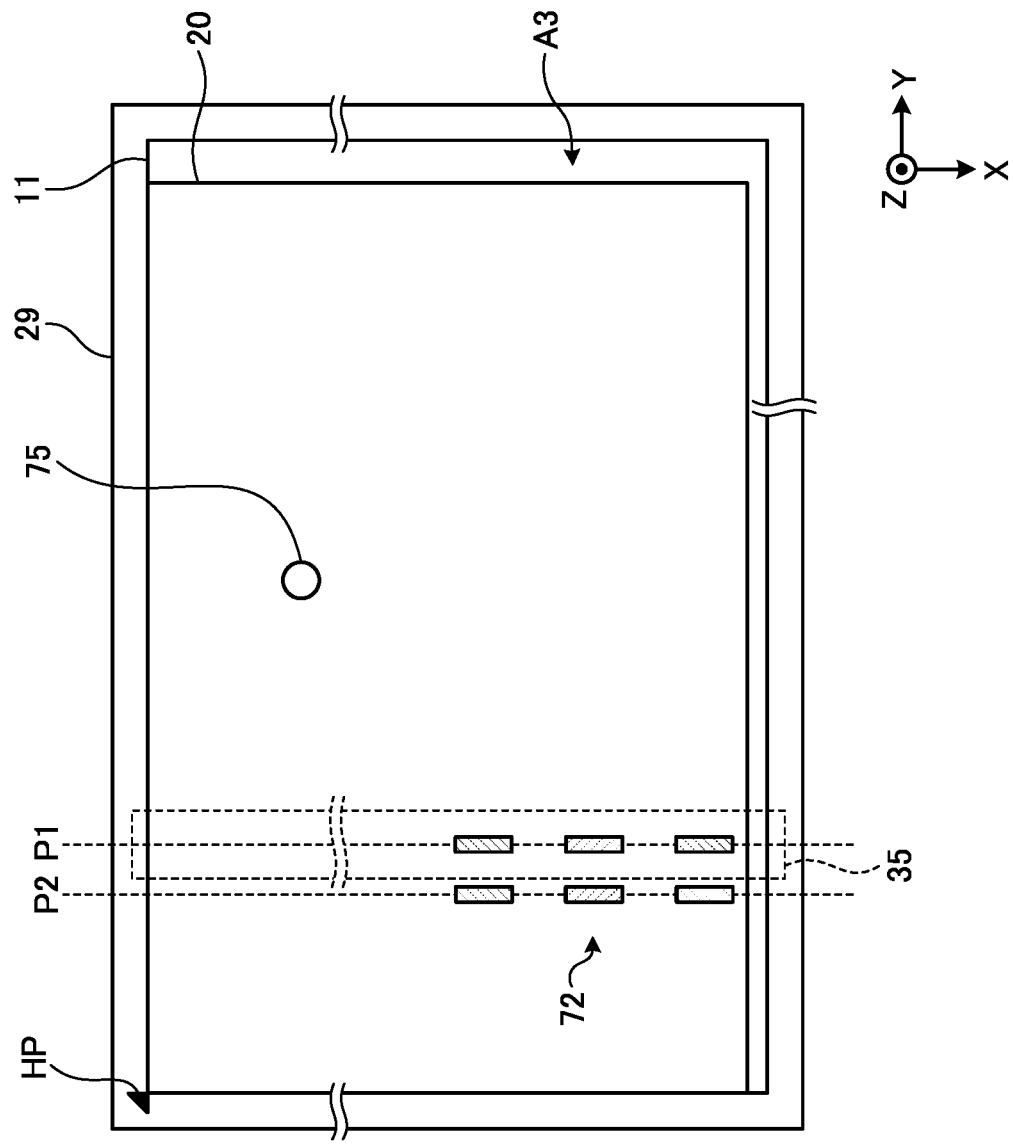
FIG. 18 is a diagram illustrating an exemplary case of detecting an A3 size document in the size detection processing according to the sixth embodiment.
Figure 19:
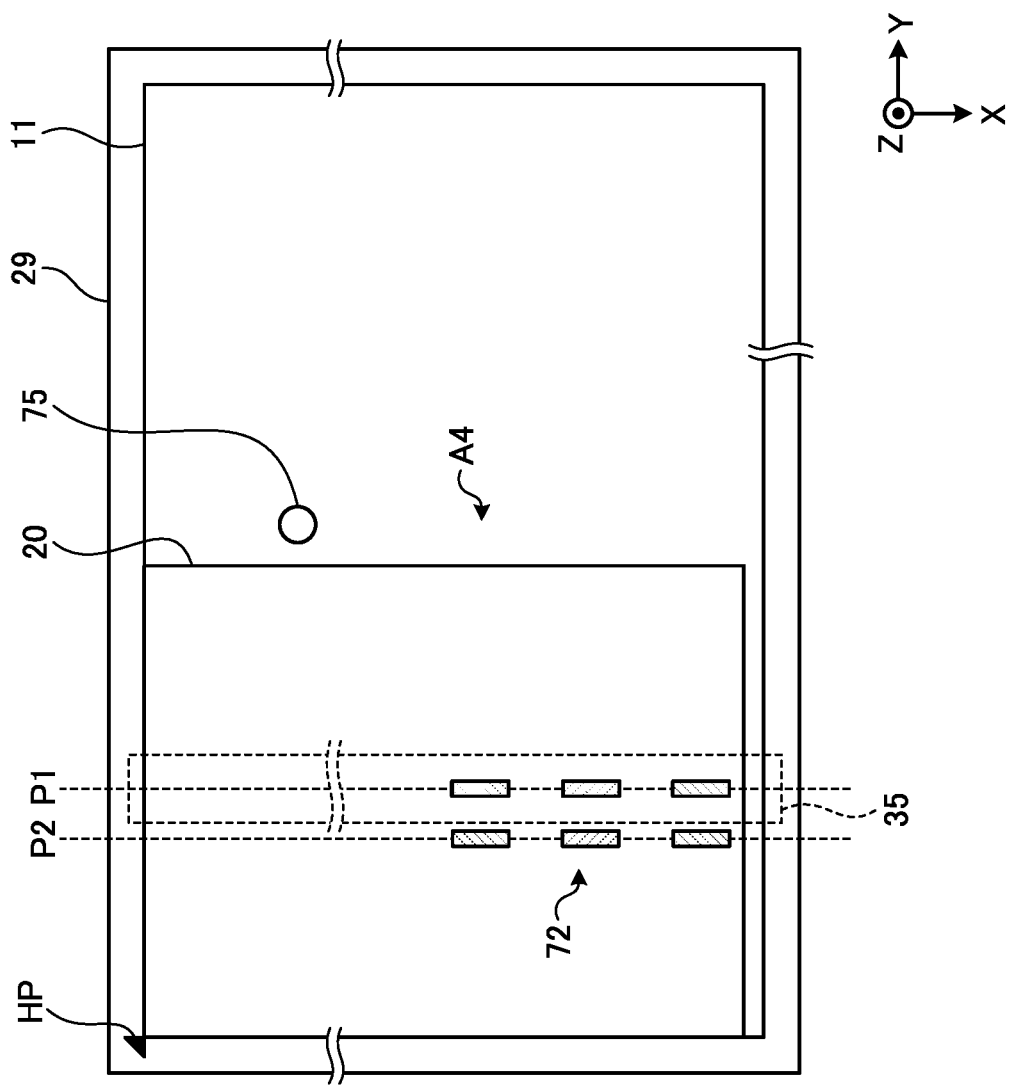
FIG. 19 is a diagram illustrating an exemplary case of detecting an A4 size document in the size detection processing according to the sixth embodiment.
Figure 20:
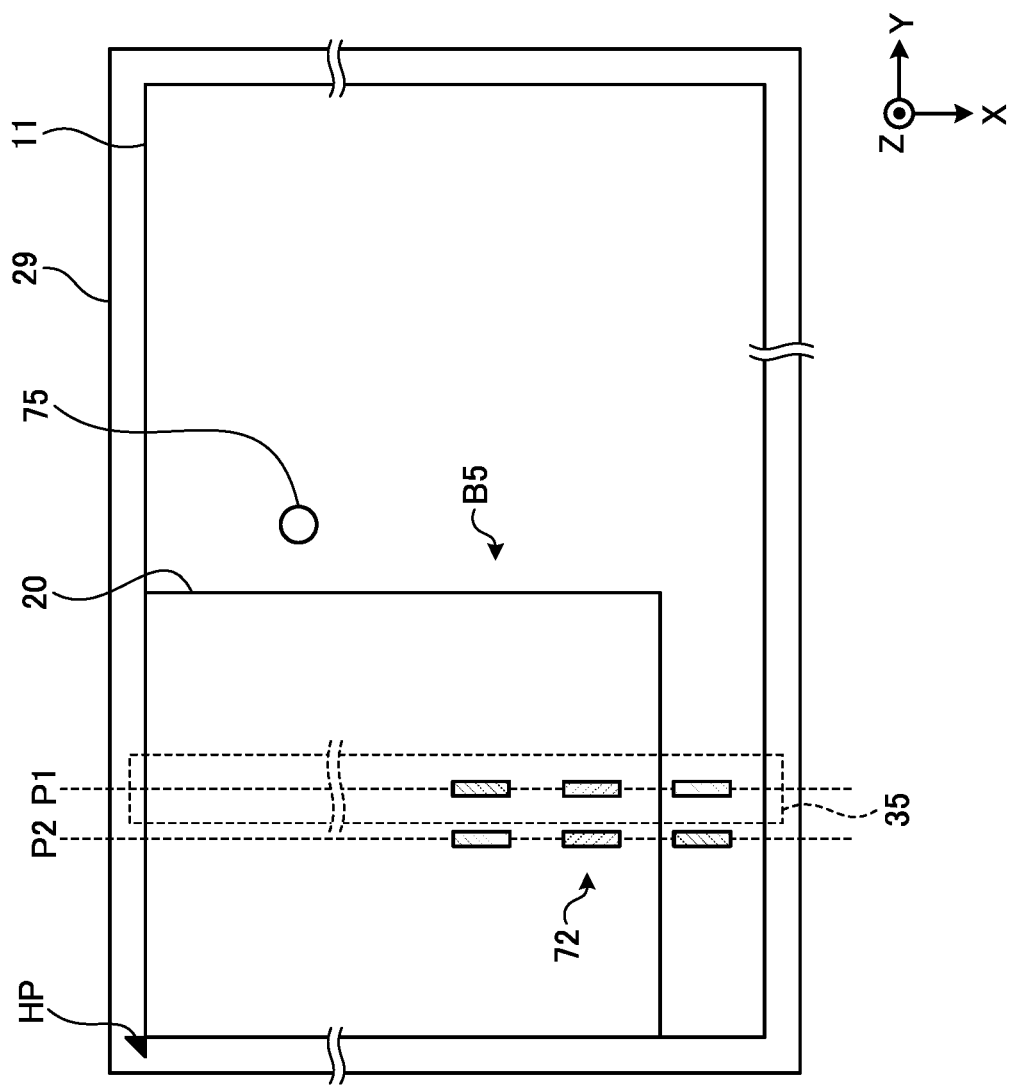
FIG. 20 is a diagram illustrating an exemplary case of detecting a B5 size document in the size detection processing according to the sixth embodiment.

FIG. 18 is a diagram illustrating an exemplary case of detecting an A3 size document in the size detection processing according to the sixth embodiment. FIG. 19 is a diagram illustrating an exemplary case of detecting an A4 size document 20 in the size detection processing according to the sixth embodiment. FIG. 20 is a diagram illustrating an exemplary case of detecting a B5 size document 20 in the size detection processing according to the sixth embodiment.

As described above, according to the present embodiment, a standard size of each document 20 can be detected based on pieces of image data discretely sampled.

Seventh Embodiment

Figure 21:
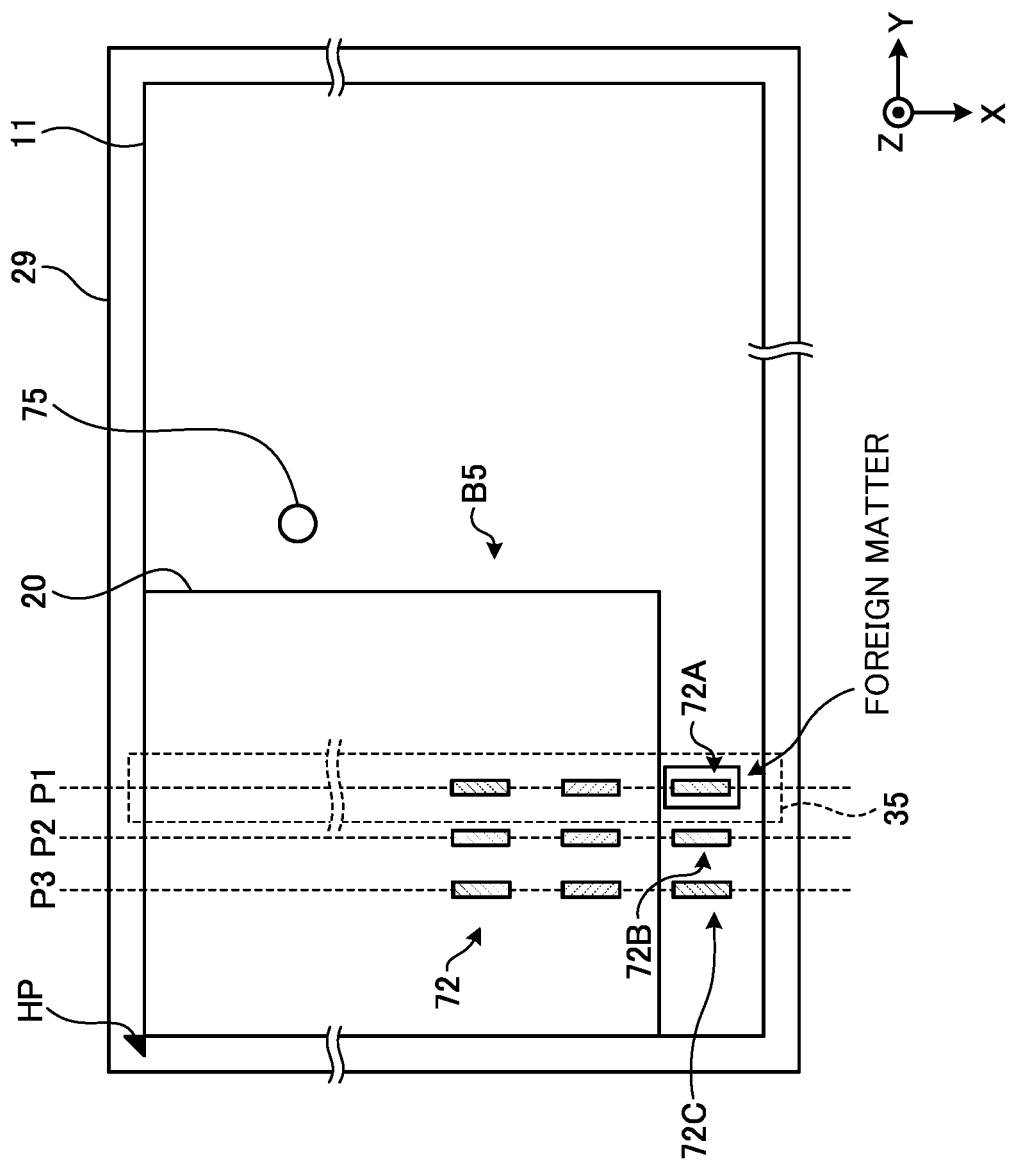
FIG. 21 is a diagram illustrating exemplary sampling of image data at the time of executing size detection processing according to a seventh embodiment.

FIG. 21 is a diagram illustrating exemplary sampling of image data at the time of executing size detection processing according to a seventh embodiment. In the present embodiment, image data is acquired discretely in each of three reading positions P1 to P3. FIG. 21 illustrates a first discrete area 72A that is an outermost discrete area at the first reading position P1, a second discrete area 72B that is an outermost discrete area at the second reading position P2, and a third discrete area 72C that is an outermost discrete area at the third reading position P3.

In the example illustrated in FIG. 21, a B5 size document 20 is placed on a contact glass 11, and a foreign matter is present in the first discrete area 72A. In such a case, the foreign matter is detected in the first discrete area 72A, but no foreign matter is detected in the second and third discrete areas 72B and 72C.

FIG. 22 is a table illustrating exemplary determination processing for an edge of a document according to the seventh embodiment. A "STATE" in FIG. 22 represents an actual state illustrated in FIG. 21. In other words, no document 20 is present in all of the first discrete area 72A, the second discrete area 72B, and the third discrete area 72C, and a foreign matter is present in the first discrete area 72A.

In a related art, determination is made based on a detection result (first image data D1 and second image data D2) at one reading position (first reading position P1). Therefore, there may be a case where an erroneous determination result of a document being "present" is obtained based on a detection result of a document being "present" in the first discrete area 72A. On the other hand, in the present embodiment, a most frequent detection result of the document being "absent" is adopted as a final determination result among the three detection results of: the document being "present" in the first discrete area 72A; the document being "absent" in the second discrete area 72B; and the document being "absent" in the third discrete area 72C. Consequently, it is possible to obtain the correct determination result of the document being "absent".

As described above, according to the present embodiment, the most frequent detection result is adopted as the final determination result among the plurality of detection results acquired at the plurality of reading positions. Consequently, accuracy of document size detection can be improved.

Eighth Embodiment

FIG. 23 is a view illustrating exemplary sampling of image data at the time of executing size detection processing according to an eighth embodiment. In the present embodiment, image data is acquired discretely in each of four reading positions P1 to P4. FIG. 23 illustrates a first discrete area 72A that is an outermost discrete area at the first reading position P1, a second discrete area 72B that is an outermost discrete area at the second reading position P2, a third discrete area 72C that is an outermost discrete area at the third reading position P3, and a fourth discrete area 72D that is an outermost discrete area at the fourth reading position P4.

In the example illustrated in FIG. 23, a B5 size document 20 is placed on a contact glass 11, and a foreign matter is present in each of the first and second discrete areas 72A and 72B. In such a case, a foreign matter is detected in each of the first and second discrete areas 72A and 72B, but no foreign matter is detected in the third and fourth discrete areas 72C and 72D.

FIG. 24 is a table illustrating an exemplary determination processing for an edge of a document according to the eighth embodiment. A "STATE" in FIG. 24 represents an actual state illustrated in FIG. 23. In other words, no document 20 is present in all of the first discrete area 72A, the second discrete area 72B, the third discrete area 72C, and the fourth discrete area 72D, and a foreign matter is present in each of the first discrete area 72A and the second discrete area 72B.

A seventh embodiment described above adopts a majority method in which a most frequent detection result is adopted as a final determination result. However, in a case of having the same number of different detection results like the present embodiment, such a majority method cannot be adopted. Therefore, in the present embodiment, in the case of having the same number of the different detection results, a most frequent detection result is determined from among the detection results based on pieces of image data acquired by moving a carriage 35. In other words, in the present example, the detection result of the document being "absent" in the third and fourth discrete areas 72C and 72D is adopted as the most frequent detection result.

As described above, according to the present embodiment, it is possible to adopt the majority method regardless of whether the number of detection results is even or odd.

Ninth Embodiment

Figure 25:
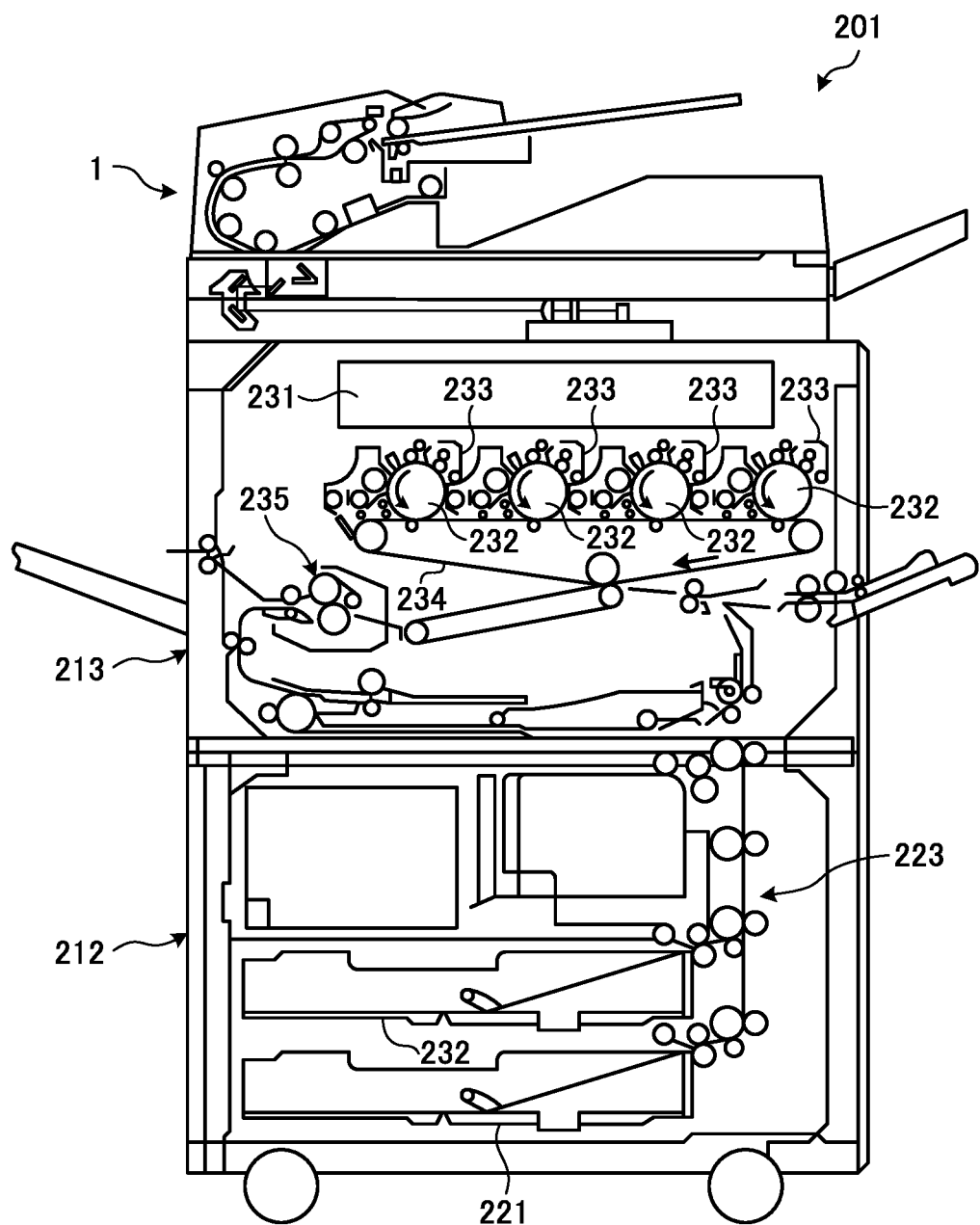
FIG. 25 is a view illustrating an exemplary configuration of a copy machine according to a ninth embodiment.

FIG. 25 is a view illustrating an exemplary configuration of a copy machine 201 according to a ninth embodiment. The copy machine 201 is an exemplary image forming apparatus including a document size detection device 101 according to any one of above-described embodiments and any one of image reading devices 1 to 3 illustrated in FIGS. 1 to 3. Here, the copy machine 201 including the image reading device 1 illustrated in FIG. 1 is illustrated. The copy machine 201 includes the image reading device 1, a sheet feeder 212, and an image forming device 213.

The sheet feeder 212 includes: sheet feeding cassettes 221 and 222 that store recording sheets (recording media) of different sizes, and a sheet feeder 223 including various kinds of rollers that convey the recording sheets stored in the sheet feeding cassettes 221 and 222 to an image forming position of the image forming device 213.

The image forming device 213 includes an exposure device 231, a photoconductor drum 232, a developing device 233, a transfer belt 234, and a fixing device 235. The image forming device 213 exposes the photoconductor drum 232 by the exposure device 231 based on image data of a document 20 read by the image reading device 1 to form a latent image on the photoconductor drum 232, and toners of different colors are supplied to the photoconductor drum 232 by the developing device 233 so as to perform development. Subsequently, the image forming device 213 transfers the image developed on the photoconductor drum 232 by the transfer belt 234 onto a recording sheet fed from the sheet feeder 212, and then the toners of toner images that have been transferred onto the recording sheet are melted to fix a color image on the recording sheet by the fixing device 235.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A document size detection device, comprising:
a light source configured to irradiate a document with light;
an imaging device configured to receive light reflected at the document; and
circuitry configured to control a switching on and off of the light source and movement in a sub-scanning direction of the light source, and determine a size in a main scanning direction of the document based on image data acquired by the imaging device,
wherein the circuitry is further configured to determine the size in the main-scanning direction of the document based on:
first image data acquired when the light source is switched off, while the light source is at a first reading position;
second image data acquired when the light source is switched on, while the light source is at the first reading position; and
third image data acquired when the light source is switched on, while the light source is being moved from the first reading position to a second reading position.

2. The document size detection device according to claim 1, wherein the circuitry is further configured to divide, in the main-scanning direction, an acquisition area where each of the first image data, second image data, and third image data is acquired, into a plurality of divided areas.

3. The document size detection device according to claim 1, wherein the circuitry is further configured to discretely divide, in the main-scanning direction, an acquisition area where each of the first image data, second image data, and third image data is acquired, into a plurality of divided areas.

4. The document size detection device according to claim 1, wherein an acquisition time of each of the first image data, second image data, and third image data acquired by the circuitry corresponds to a plurality of cycles of a synchronization signal.

5. The document size detection device according to claim 1, wherein the circuitry is further configured to acquire the third image data while a movement speed of the light source is accelerated.

6. The document size detection device according to claim 1, wherein the circuitry is further configured to acquire the third image data successively a plurality of times.

7. The document size detection device according to claim 1, wherein the circuitry is further configured to acquire the image data a plurality of times at a predetermined interval.

8. The document size detection device according to claim 1, wherein, when the circuitry acquires a plurality of detection results corresponding to a plurality of reading positions, the circuitry is further configured to determine the size based on a most frequent detection result.

9. The document size detection device according to claim 8, wherein, when the circuitry acquires A same number of different detection results, the circuitry is further configured to determine the size based on a most frequent detection result from which a detection result corresponding to the first reading position is excluded.

10. An image reading device comprising the document size detection device according to claim 1, wherein the circuitry is further configured to read an image of a document having the size detected by the document size detection device.

11. An image forming apparatus comprising:
the image reading device according to claim 10; and
an image forming device configured to print, on a recording medium, an image read by the image reading device.

12. A document size detecting method, comprising:
controlling switching on and off of a light source that irradiates a document with light; and
controlling movement in a sub-scanning direction of the light source; and
determining a size in a main-scanning direction of the document based on image data acquired by an imaging device that receives light reflected at the document,
wherein the determining step includes
acquiring first image data when the light source is switched off, while the light source is at a first reading position;
acquiring second image data when the light source is switched on, while the light source is at the first reading position;
acquiring third image data when the light source is switched on, while the light source is being moved from the first reading position to a second reading position; and
determining the size in the main-scanning direction of the document based on the acquired first image data, the acquired second image data, and the acquired third image data.

13. The document size detecting method of claim 12, wherein the step of acquiring the third image data comprises acquiring the third image away from the first reading position.

14. A non-transitory recording medium which, when executed by one or more processors, cause the processors to perform a document size detecting method comprising:
controlling a switching on and off of a light source that irradiates a document with light;
controlling movement in a sub-scanning direction of the light source; and
determining a size in a main-scanning direction of the document based on image data acquired by an imaging device that receives light reflected at the document,
wherein the determining step includes:
acquiring first image data when the light source is switched off, while the light source is at a first reading position;
acquiring second image data when the light source is switched on, while the light source is at the first reading position;
acquiring third image data when the light source is switched on, while the light source is being moved from the first reading position to a second reading position; and
determining the size in the main-scanning direction of the document based on the acquired first image data, the acquired second image data, and the acquired third image data.

* * * * *